(12) United States Patent
Sato et al.

(10) Patent No.: US 6,751,687 B1
(45) Date of Patent: Jun. 15, 2004

(54) METHOD OF CONTROLLING DEVICE, TRANSMISSION DEVICE, AND MEDIUM

(75) Inventors: Makoto Sato, Tokyo (JP); Yoshiyuki Takaku, Tokyo (JP); Futoshi Kaibuki, Tokyo (JP); Mari Horiguchi, Kanagawa (JP); Naoyuki Sato, Tokyo (JP); Yuichi Kageyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 400 days.

(21) Appl. No.: 09/857,279

(22) PCT Filed: Oct. 4, 2000

(86) PCT No.: PCT/JP00/06914

§ 371 (c)(1),
(2), (4) Date: Feb. 8, 2002

(87) PCT Pub. No.: WO01/26295

PCT Pub. Date: Apr. 12, 2001

(30) Foreign Application Priority Data

Oct. 4, 1999 (JP) ............................................ 11/283452

(51) Int. Cl.⁷ .......................... G06F 13/00; G06F 13/14
(52) U.S. Cl. ................................ 710/62; 710/5; 710/8; 700/257; 348/734
(58) Field of Search ................... 710/5, 8, 62; 700/257; 348/734

(56) References Cited

U.S. PATENT DOCUMENTS 5,552,917 A * 9/1996 Darbee et al. .............. 398/107
6,285,357 B1 * 9/2001 Kushiro et al. ............. 345/169

FOREIGN PATENT DOCUMENTS

| CN | 1212422 A | 3/1999 |
|---|---|---|
| DE | 198 42 639 A1 | 3/1999 |
| FR | 2 768 844 | 3/1999 |
| JP | 11-96735 | 4/1999 |
| JP | 11-205313 | 7/1999 |

* cited by examiner

Primary Examiner—Rehana Perveen
(74) Attorney, Agent, or Firm—Frommer Lawrence & Haug LLP; William S. Frommer; Darren M. Simon

(57) ABSTRACT

Between a first equipment and a second equipment connected to a predetermined bus line, it is arranged that data for setting, etc. on input selection in the first equipment is instructed from the second equipment in the form of command having a predetermined format through the bus line, thus allowing an independent remote control to be performed between the first equipment and the second equipment. Moreover, data on input selection in the first equipment is transmitted to the second equipment, so that, for example, the remote control of the input selection in the first equipment linking with the operation of the second equipment will be performed satisfactorily.

6 Claims, 26 Drawing Sheets

FIG. 6

| OFFSET | NAME | FUNCTION |
|---|---|---|
| 000h | STATE CLEAR | STATUS AND CONTROL INFORMATION |
| 004h | STATE SET | SET STATE CLEAR BIT |
| 008h | NODE ID | INDICATE 16 BIT NODE ID |
| 00Ch | RESET START | START COMMAND RESET |
| 018-01Ch | SPLIT TIME OUT | DEFINE MAX. SPLIT TIME |
| 200h | CYCLE TIME | CYCLE TIME |
| 210h | BUSY TIME OUT | DEFINE LIMIT OF RETRY |
| 21Ch | BUS MANAGER | INDICATE BUS MANAGER ID |
| 220h | BANDWIDTH AVAILABLE | INDICATE BANDWIDTH AVAILABLE TO ISOCHRONOUS COMMUNICATION |
| 224h-228h | CHANNEL AVAILABLE | INDICATE CHANNELS AVAILABLE |

FIG. 7

| | |
|---|---|
| 900h | OUTPUT MASTER PLUG REGISTER |
| 904h | OUTPUT PLUG CONTROL REGISTER #0 |
| 908h | OUTPUT PLUG CONTROL REGISTER #1 |
| ⋮ | ⋮ |
| 97Ch | OUTPUT PLUG CONTROL REGISTER #30 |
| 980h | INPUT MASTER PLUG REGISTER |
| 984h | INPUT PLUG CONTROL REGISTER #0 |
| 988h | INPUT PLUG CONTROL REGISTER #1 |
| ⋮ | ⋮ |
| 9FCh | INPUT PLUG CONTROL REGISTER #30 |

FIG. 8

| 400h | 04h | CRC LENGTH | ROM CRC VALUE |
|---|---|---|---|

BUS INFO BLOCK

| 404h | "1394" | | |
|---|---|---|---|
| 408h | RESERVED | cyc clk acc | max rec | RESERVED |
| 40Ch | COMPANY ID | | CHIP ID (hi) |
| 410h | CHIP ID (lo) | | |

ROOT DIRECTORY

| 414h | ROOT LENGTH | CRC |
|---|---|---|
| 418h | 03h | MODULE VENDOR LENGTH |
| 41Ch | 0Ch | NODE CAPABILITIES |
| 420h | 8Dh | NODE UNIQUE ID OFFSET |
| 424h | D1h | UNIT DIRECTORY OFFSET |
| 428h ⋮ | | OPTIONAL |

UNIT DIRECTORY

| UNIT DIRECTORY LENGTH | CRC |
|---|---|
| 12h | UNIT SPEC ID |
| 13h | UNIT SW VERSION |
| ⋮ | OPTIONAL |

FIG. 9A oMPR

| DATA RATE CAPABILITY | BROADCAST CHANNEL BASE | NON-PERSISTENT EXTENSION FIELD | PERSISTENT EXTENSION FIELD | (RESERVED) | NUMBER OF OUTPUT PLUGS |
|---|---|---|---|---|---|
| 2 | 6 | 8 | 8 | 3 | 5 (BIT) |

FIG. 9B oPCR[n]

| ON-LINE | BROADCAST CONNECTION COUNTER | P-P CONNECTION COUNTER | (RESERVED) | CHANNEL NUMBER | DATA RATE | OVERHEAD ID | PAYLOAD |
|---|---|---|---|---|---|---|---|
| 1 | 1 | 6 | 2 | 6 | 2 | 4 | 10 (BIT) |

FIG. 9C iMPR

| DATA RATE CAPABILITY | (RESERVED) | NON-PERSISTENT EXTENSION FIELD | PERSISTENT EXTENSION FIELD | (RESERVED) | NUMBER OF INPUT PLUGS |
|---|---|---|---|---|---|
| 2 | 6 | 8 | 8 | 3 | 5 (BIT) |

FIG. 9D oPCR[n]

| ON-LINE | BROADCAST CONNECTION COUNTER | P-P CONNECTION COUNTER | (RESERVED) | CHANNEL NUMBER | (RESERVED) |
|---|---|---|---|---|---|
| 1 | 1 | 6 | 2 | 6 | 16 (BIT) |

FIG. 12

| address | GENERAL SUBUNIT IDENTIFIER DESCRIPTOR |
|---|---|
| | CONTENTS |
| 00 00₁₆ | DESCRIPTOR LENGTH |
| 00 01₁₆ | |
| 00 02₁₆ | GENERATION ID |
| 00 03₁₆ | SIZE OF LIST ID |
| 00 04₁₆ | SIZE OF OBJECT ID |
| 00 05₁₆ | SIZE OF OBJECT POSITION |
| 00 06₁₆ | NUMBER OF ROOT OBJECT LISTS (n) |
| 00 07₁₆ | |
| 00 08₁₆ | ROOT OBJECT LIST ID 0 |
| ⋮ | ⋮ |
| ⋮ | ROOT OBJECT LIST ID n-1 |
| ⋮ | SUBUNIT DEPENDENT LENGTH |
| ⋮ | SUBUNIT DEPENDENT INFORMATION |
| ⋮ | MANUFACTURER DEPENDENT LENGTH |
| ⋮ | MANUFACTURER DEPENDENT INFORMATION |

FIG. 13

| GENERATION ID VALUES ||
|---|---|
| GENERATION ID | MEANING |
| $00_{16}$ | AV/C GENERAL SPECIFICATION, VERSION 3.0 |
| ALL OTHERS | RESERVED |

FIG. 14

| LIST ID VALUE ASSIGNMENT ||
|---|---|
| VALUES | LIST |
| $0000_{16}$ $0FFF_{16}$ | RESERVED |
| $1000_{16}$ $3FFF_{16}$ | SUBUNIT TYPE DEPENDENT |
| $4000_{16}$ $FFFF_{16}$ | RESERVED |
| $1\ 000_{16}$ | SUBUNIT TYPE DEPENDENT |

STACK MODEL

COMMAND AND RESPONSE OF FCP

FIG. 19

| COMMAND TYPE/RESPONSE | | |
|---|---|---|
| COMMAND | 0000 | CONTROL |
| | 0001 | STATUS |
| | 0010 | SPECIFIC INQUIRY |
| | 0011 | NOTIFY |
| | 0100 | GENERAL INQUIRY |
| | 0101 | (RESERVED) |
| | ~ | |
| | 0111 | |
| RESPONSE | 1000 | NOT IMPLEMENTED |
| | 1001 | ACCEPTED |
| | 1010 | REJECTED |
| | 1011 | IN TRANSITION |
| | 1100 | IMPLEMENTED/STABLE |
| | 1101 | CHANGED |
| | 1110 | (RESERVED) |
| | 1111 | INTERIM |

| SUBUNIT TYPE | |
|---|---|
| 00000 | VIDEO MONITOR |
| ~ | |
| 00011 | DISC RECORDER/PLAYER |
| 00100 | TAPE RECORDER/PLAYER |
| 00101 | TUNER |
| 00111 | VIDEO CAMERA |
| 01010 | BBS |
| 11100 | VENDOR UNIQUE |
| 11101 | RESERVED |
| 11110 | (SPECIFIC SUBUNIT TYPE) |
| 11111 | UNIT |

| OPCODE: OPERATION CODE | |
|---|---|
| 00h | VENDOR DEPENDENT |
| 50h | SEARCH MODE |
| 51h | TIME CODE |
| 52h | ATN |
| 60h | OPEN MEMORY |
| 61h | READ MEMORY |
| 62h | WRITE MEMORY |
| C1h | LOAD |
| C2h | RECORD |
| C3h | PLAYBACK |
| C4h | REWIND |
| ~ | |

FIG. 20A

TAPE RECORDER/PLAYER  FOR ID0  PLAYBACK  FORWARD

| AV/C CONTROL | CTYPE = 0000 | SUBUNIT TYPE = 00100 | id = 000 | OPCODE = C3h | OPERAND = 75h |
|---|---|---|---|---|---|
| CTS = 0000 | | | | | |

FIG. 20B

TAPE RECORDER/PLAYER  FOR ID0  PLAYBACK  FORWARD

| AV/C ACCEPTED | RESPONSE = 1001 | SUBUNIT TYPE = 00100 | id = 000 | OPCODE = C3h | OPERAND = 75h |
|---|---|---|---|---|---|
| CTS = 0000 | | | | | |

FIG. 21

FIRST VIDEO RECEIVER 10     FIRST VIDEO EQUIPMENT 30

S11
OUTPUT PRESET CONTROL COMMAND

S12
RESPONSE
(PRESET ENTRY NUMBER)

FIG. 22

| PRESET ENTRY | NODE ID |
|---|---|
| 1 | TV1 |
| 2 | TV2 |
| 3 | ------- |

FIG. 23

|  | CONTROL COMMAND | | RESPONSE |
|---|---|---|---|
| OPCODE | INPUT PRESET | | <<< |
| OPERAND[0] | 0 | 0x7F | PRESET ENTRY NUMBER |
| OPERAND[1] | DESTINATION NODE ID | | <<< |
| OPERAND[2] | | | |
| OPERAND[3] | SIGNAL DESTINATION | | <<< |
| OPERAND[4] | | | |

OUTPUT PRESET CONTROL

FIG. 24

|  | STATUS COMMAND | RESPONSE |
|---|---|---|
| OPCODE | OUTPUT PRESET | <<< |
| OPERAND[0] | PRESET ENTRY NUMBER | <<< |
| OPERAND[1] | 0xFF | DESTINATION NODE ID |
| OPERAND[2] | 0xFF | |
| OPERAND[3] | 0xFF | SIGNAL DESTINATION |
| OPERAND[4] | 0xFF | |

OUTPUT PRESET STATUS

FIG. 25

|  | CONTROL COMMAND | | RESPONSE | |
|---|---|---|---|---|
| OPCODE | INPUT SELECT | | <<< | |
| OPERAND [0] | SUBFUNCTION | | <<< | |
| OPERAND [1] | RESERVED | 0xF | RESERVED | RESULT STATUS |
| OPERAND [2] | NODE ID | | <<< | |
| OPERAND [3] | | | | |
| OPERAND [4] | OUTPUT PLUG | | <<< | |
| OPERAND [5] | INPUT PLUG | | <<< | |
| OPERAND [6] | SIGNAL DESTINATION | | <<< | |
| OPERAND [7] | | | <<< | |
| OPERAND [8] | RESERVED | | <<< | |

INPUT SELECT CONTROL

FIG. 26

|  | CONTROL COMMAND | RESPONSE | |
|---|---|---|---|
| OPCODE | INPUT SELECT | <<< | |
| OPERAND [0] | 0xFF | <<< | |
| OPERAND [1] | 0xFF | STATUS | 0xF |
| OPERAND [2] | 0xFF | NODE ID | |
| OPERAND [3] | 0xFF | | |
| OPERAND [4] | 0xFF | OUTPUT PLUG | |
| OPERAND [5] | INPUT PLUG | <<< | |
| OPERAND [6] | 0xFF | SIGNAL DESTINATION | |
| OPERAND [7] | 0xFE | | |
| OPERAND [8] | RESERVED | RESERVED | |

INPUT SELECT STATUS

USE EXAMPLE OF REQUEST LEVEL

FIG. 29

|  | STATUS COMMAND | RESPONSE | | |
|---|---|---|---|---|
| OPCODE | SIGNAL SOURCE | <<< | | |
| OPERAND [0] | 0xFE | OUTPUT STATUS | conv | SIGNAL STATUS |
| OPERAND [1] | 0xFE | SIGNAL SOURCE | | |
| OPERAND [2] | 0xFE | | | |
| OPERAND [3] | SIGNAL DESTINATION | SIGNAL DESTINATION | | |
| OPERAND [4] | | | | |

SIGNAL SOURCE STATUS

FIG. 30

|  | STATUS COMMAND | RESPONSE | | |
|---|---|---|---|---|
| OPCODE | SIGNAL SOURCE | <<< | | |
| OPERAND [0] | 0xFE | OUTPUT STATUS | conv | SIGNAL STATUS |
| OPERAND [1] | 0xFE | 0x3 | ISOCHRONOUS CHANNEL | |
| OPERAND [2] | 0xFE | SOURCE PLUG ID | | |
| OPERAND [3] | SIGNAL DESTINATION | SIGNAL DESTINATION | | |
| OPERAND [4] | | | | |

SIGNAL SOURCE STATUS (FORMAT IN CASE OF VIRTUAL OUTPUT)

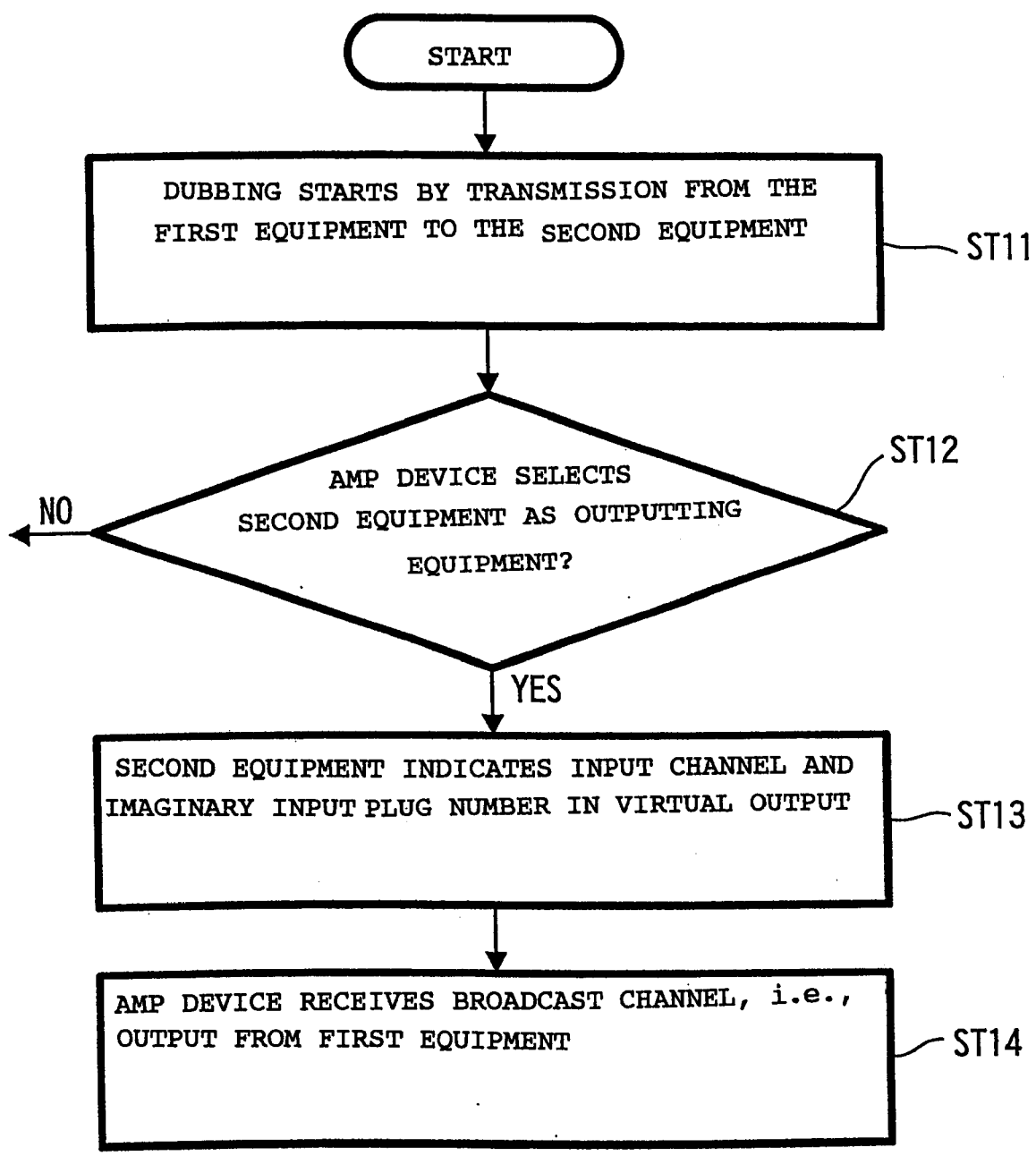
PROCESS EXAMPLE OF REC MONITOR (EXAMPLE 1)

PROCESS EXAMPLE OF REC MONITOR (EXAMPLE 2)

though the serial communication bus according to IEEE 1394 system are controlled by each other and also relates to a medium in which a program for performing the control between the equipments connected through the serial communication bus is stored.
METHOD OF CONTROLLING DEVICE, TRANSMISSION DEVICE, AND MEDIUM

TECHNICAL FIELD

The present invention relates to an equipment control method and a transmission apparatus which are applicable to a case where equipments connected through e.g. a serial communication bus according to IEEE 1394 system are controlled by each other and also relates to a medium in which a program for performing the control between the equipments connected through the serial communication bus is stored.

BACKGROUND ART

AV equipments which are capable of transmitting information to each other through a network using the serial communication bus according to IEEE1394 system have hitherto been developed. In this network, it is possible to control AV equipments connected to the network by transmitting a prescribed command (AV/C Command Transaction Set: hereinafter referred to "AV/C command"). While details of the AV/C command will be described below, it is also described in AV/C Digital Interface Command Set General Specification which was laid open by 1394 Trade Association.

By the way, when a configuration in which a plurality of AV equipments are connected is considered, if e.g. one television receiver and a plurality of video equipments (video deck) are connected with each other, it is then necessary for the side of television receiver that is an input equipment of video signals to select a video equipment forming a signal source. In this connection, various kinds of systems exist which are capable of an operation to automatically receive images at the input equipment by an operation from a signal source equipment (what is called "auto play"), in the case of system configuration e.g. connected through a conventional video cable which transmits analog video signals. In addition, if it is also possible to perform an auto video recording in which a video equipment can select and record video signals that is received on the side of television receiver, it would be convenient to users.

Unfortunately, in the previously proposed AV/C command, because these selection processings of the input and output equipments are basically performed under the control of a center controller on a bus line, the center controller must bear a heavy load and an arbitrary equipment on the bus line cannot process to select the input or output equipment independently without instructions from the center controller, which involves a problem.

DISCLOSURE OF THE INVENTION

An object of the present invention is to enable linking operations such as the autoplay to be efficiently performed between the equipments connected through the IEEE 1394 system bus and the like.

According to a first invention, in an equipment control method of performing the control between equipments connected through a predetermined bus line, setting on input selection at a first equipment is instructed from a second equipment through the bus line by a command of a predetermined format.

Arranging in this way, a remote control of the input selection at one equipment linked with an operation of the other equipment is enabled between a plurality of equipments connected through a bus line. Therefore, it is possible to make good control between specific equipments within a network using the format such as AV/C command without the control of the center controller or the like.

According to a second invention, in an equipment control method of the first invention, the instructions about setting on input selection at the first equipment can previously be registered.

Arranging in this way will enable a simple control using the previously registered instructions.

According to a third invention, in an equipment control method of performing the control between equipments connected through a predetermined bus line, the status of input selection at a first equipment connected to the bus line is informed to a second equipment connected to the bus line, so that the second equipment can specify an input signal source of the first equipment.

By arranging in this way, among the plurality of equipments connected through the bus line, the input signal source at one of the equipments can be simply specified by the other equipments.

According to a fourth invention, in an equipment control method of the third invention, when the second equipment desires to input an output of the first equipment, the second equipment inputs a signal from an input signal source which the second equipment specifies by the informed data.

By arranging in this way, the same data as those handled by the first equipment can also be acquired by the other equipment.

According to a fifth invention, in an equipment control method of performing the control between equipments connected through a predetermined bus line, when data outputted from a first equipment can be inputted by a second equipment, data on an output route change of that data from the first equipment is transmitted to the second equipment through the bus line.

Arranging in this way will enable the second equipment to cope with a change of output route in transmission through the bus line.

According to a sixth invention, in an equipment control method of the fifth invention, the output route includes an output route other than the bus line.

By arranging in this way, the second equipment can cope with a change to an output route other than the bus line and also with a change from an output route other than the bus line.

According to a seventh invention, in an equipment control method of the fifth invention, for the data on the output route change, at least two kinds of requests are prepared, a first request instructing the second equipment about input switching to the changed route and a second request not instructing about the input switching, but causing the second equipment to estimate only the route change.

By arranging in this way, the second equipment can cope with a case where the input switching is instructed following a change of output route and also with a case where the input switching is not instructed.

According to a eighth invention, in an equipment control method of performing the control between equipments connected through a predetermined bus line, at the request of a first equipment, data transmission from a second equipment to the first equipment is instructed, and the second equipment which receives the instructions about data transmission transmits to the first equipment data on an output port set for the first equipment.

By arranging in this way, data transmission can be instructed to other equipment connected through the bus line and an equipment which has instructed can estimate by its instructions an output status of the equipment which has been instructed on the data transmission, thus allowing the equipment which has instructed to receive data transmitted to the bus line without fail.

According to a ninth invention, in an equipment control method of performing the control between equipments connected to a predetermined bus line, the first equipment instructs the second equipment to receive data, and based on the instructions, the second equipment determines setting on input and transmits data thus set to the first equipment.

By arranging in this way, data reception can be instructed to other equipment connected through the bus line and an equipment which has instructed can estimate by its instructions an input status of the equipment which has been instructed on the data reception, thus allowing the partner equipment to receive data transmitted to the bus line without fail.

According to a tenth invention, there is provided a transmission apparatus capable of data transmission with other equipment connected through a predetermined bus line, comprising a command producing section for producing a command of a predetermined format to perform setting on input selection at other equipment connected through the bus line, and a sending section for sending the command produced by the command producing section to the bus line.

Arranging in this way will enable a remote control of setting with respect to the input selection at other equipment connected through the bus line.

According to an eleventh invention, in a transmission apparatus of the tenth invention, the command instructing about setting on input selection produced by the command producing section is previously sent out from the sending section before the input selection is executed at the other equipment.

Arranging in this way will allow the control of other equipment to be performed satisfactorily.

According to a twelfth invention, there is provided a transmission apparatus capable of data transmission with other equipment connected through a predetermined bus line, comprising a command producing section for producing a command of a predetermined format to inform on the status of input selection to other equipment connected through the bus line, and a sending section for sending out the command produced by the command producing section to the bus line.

By arranging in this way, the input selection status at this transmission apparatus is informed to other equipments connected through the bus line, so that transmission status inside a network connected through the bus line can be estimated by other equipments.

According to a thirteenth invention, there is provided a transmission apparatus capable of data transmission with other equipment connected through a predetermined bus line, comprising an input section for inputting data transmitted through the bus line, and a data processing section for estimating a command on the status of input selection at other equipment connected through the bus line from the data inputted by the input section and then storing the command.

By arranging in this way, the input selection status at other equipment connected through the bus line can be estimated and stored, so that the estimated equipment can be controlled satisfactorily.

According to a fourteenth invention, there is provided a transmission apparatus capable of data transmission with other equipment through a predetermined bus line, comprising a command producing section for producing a command of a predetermined format instructing other equipment connected through the bus line about an output route change, and a sending section for sending out the command produced by the command producing section to the bus line.

By arranging in this way, it will be possible to instruct other equipments connected through the bus line on a change of the output route on the bus line, thereby enabling the equipment to cope easily with a change of transmission route.

According to a fifteenth invention, in a transmission apparatus of the fourteenth invention, the output route indicated by the command produced by the command producing section includes an output route other than the bus line.

Arranging in this way will enable the equipment to cope with a change to an output route other than the bus line and also with a change from an output route other than the bus line.

According to a sixteenth invention, in a transmission apparatus of the fourteenth invention, for the command on the output route change produced by the command producing section, a command instructing about input switching to the changed route and a command not instructing about the input switching, but deciding only the route change are prepared.

Arranging in this way will enable the equipment to cope with a case where the input switching is instructed following a change of the output route and also with a case where the input switching is not instructed.

According to a seventeenth invention, there is provided a transmission apparatus capable of data transmission with other equipment connected through a predetermined bus line, comprising an input section for inputting data transmitted through the bus line, and a data processing section for estimating and storing a command on the status of output route in other equipment connected through the bus line.

Arranging in this way will enable the equipment to estimate and store the output route of data at other equipment connected through the bus line.

According to an eighteenth invention, in a transmission apparatus of the seventeenth invention, the output route indicated by the command estimated in the data processing section includes an output route other than the bus line.

Arranging in this way will enable the equipment to estimate even if an output route other than the bus line is used.

According to a nineteenth invention, in a transmission apparatus of the seventeenth invention, when the data processing section estimates the command, a processing to switch to inputting data from the changed output route or a processing to only estimate the changed output route is selectively performed by that command.

Arranging in this way will enable the equipment to cope with a case where the input switching is instructed following a change of the output route and also with a case where the input switching is not instructed.

According to a twentieth invention, there is provided a transmission apparatus capable of data transmission with other equipment connected through a predetermined bus line, comprising an input/output section for inputting data transmitted through the bus line and outputting the data to the bus line, and a data processing section for producing, when a command, instructing about transmitting data to other equipment connected through the bus line is estimated from the data inputted by the input/output section, a command on a setting status of the input/output section transmitting the data.

By arranging in this way, when transmitting data according to instructions from other equipment, it will be possible to notify the setting status of the input/output section to the partner equipment and then transmit data satisfactorily through the bus line.

According to a twenty-first invention, there is provided a transmission apparatus capable of data transmission with other equipment connected through a predetermined bus line, comprising an input/output section for inputting data transmitted through the bus line and outputting data to the bus line, and a data processing section for producing a command instructing about transmitting data to other equipment connected through the bus line to make the input/output section transmit the command, estimating data on the setting status of output transmitted from the other equipment based on the command and storing that data.

By arranging in this way, when instructing about transmitting data to other equipment, it will be possible to estimate the setting status of data output based on data transmitted from the partner equipment and thus receive data transmitted from the instructed equipment satisfactorily.

According to a twenty-second invention, there is provided a transmission apparatus capable of data transmission with other equipment connected through a predetermined bus line, comprising an input/output section for inputting data transmitted through the bus line and outputting data to the bus line, and a data processing section which, when a command instructing about receiving data from other equipment connected through the bus line is estimated from the data inputted by the input/output section, produces a command about setting status of the input/output section for receiving the data.

By arranging in this way, when receiving data according to instructions from other equipment, it will be possible to notify the setting status of the input/output section at that time to the partner equipment and thus perform satisfactory data transmission with the other equipment connected through the bus line.

According to a twenty-third invention, there is provided a transmission apparatus capable of data transmission with other equipment connected through a predetermined bus line, comprising an input/output section for inputting data transmitted through the bus line and outputting data to the bus line, and a data processing section for producing a command instructing other equipment connected through the bus line about receiving data, for transmitting the command from the input/output section, and for estimating data on an input setting status transmitted from the other equipment based on the transmitted command in order to store the data.

By arranging in this way, when instructing other equipment about receiving data, it will be possible to estimate the input setting status of the partner equipment and so transmit data satisfactorily to the partner equipment.

According to a twenty-fourth invention, in a medium in which a program for performing the control between equipments connected through a predetermined bus line is retained, the program comprises the step of instructing about setting on input selection in a first equipment by means of a predetermined format of command transmitted from a second equipment through the bus line.

By arranging in this way, it will be possible to make a remote control of an input selection at one of equipments linked with an operation of the other equipment using the bus line to which equipments installed with this program are connected and make a satisfactory control between specific equipments within a network using the form such as the AV/C command without the control of the center controller and the like.

According to a twenty-fifth invention, in a medium of the twenty-fourth invention, the program further comprises the step of causing the instructions about setting on input selection in the first equipment to be registered in advance.

Arranging in this way will enable a simple control by using the instructions which is beforehand registered in the equipment installed with this program.

According to a twenty-sixth invention, in a medium in which a program for performing the control between equipments connected through a predetermined bus line is retained, the program comprises the step of informing about the status of input selection in a first equipment connected to the bus line to a second equipment connected to the bus line, so that the second equipment can specify an input signal source to the first equipment.

By arranging in this way, the equipment installed with this program will be able to simply specify the input signal source at other equipment on the bus line.

According to a twenty-seventh invention, in a medium of the twenty-sixth invention, the program further comprises the step of causing the second equipment to input a signal from the input signal source specified by the second equipment using data informed by the processing at the above informing step.

Arranging in this way will enable the equipment installed with this program to acquire the same data as those handled by other equipment.

According to a twenty-eighth invention, in a medium in which a program for performing the control between equipments connected through a predetermined bus-line, when data outputted from a first equipment can be inputted by a second equipment, the program comprises the step of causing data on a change of an output route of the data from the first equipment to be transmitted to the second equipment through the bus line.

Arranging in this way will enable the equipment installed with this program to cope with a change of the output route when transmitting through the bus line.

According to a twenty-ninth invention, in a medium of the twenty-eighth invention, the output route to be changed in the above step includes an output route other than the bus line.

Arranging in this way will enable the equipment installed with this program to cope with a change to the output route other than the bus line and also with a change from the output route other than the bus line.

According to a thirtieth invention, in a medium of the twenty-eighth invention, the processing on a change of the output route in the above step includes two kinds of requests, a request instructing the second equipment at least about input switching to the changed route, and another request not instructing the second equipment about input switching, but only causing the second equipment to estimate the change of route.

Arranging in this way will enable the equipment installed with this program to cope with a case where the input switching is instructed following a change of the output route and also with a case where the input switching is not instructed.

According to a thirty-first invention, in a medium in which a program for performing the control between equipments connected through a predetermined bus line, the program comprises the steps of sending instructions about transmitting data from a second equipment to a first equipment based on the request from the first equipment, and causing the second equipment which receives the instructions about transmitting data in the above step to transmit to the first equipment data on an output port arranged for the first equipment.

By arranging in this way, the equipment installed with this program will be able to instruct about transmitting data to other equipment connected through the bus line and the equipment which has instructed can estimate by its instructions an output status of the equipment which has been instructed about transmitting data, so that the equipment which has instructed can receive without fail data transmitted to the bus line.

According to a thirty-second invention, in a medium in which a program for performing the control between equipments connected through a predetermined bus line, the program comprises the steps of sending instructions from a first equipment to a second equipment about receiving data, and determining setting on input by the second equipment based on the instructions in the above step to cause the set data to be transmitted to the first equipment.

By arranging in this way, the equipment installed with this program will be able to instruct on receiving data to other equipment connected through the bus line and can estimate by its instructions an input status at the equipment which is instructed on receiving data, so that the partner equipment can be made to receive without fail data transmitted to the bus line.

BRIEF DESCRIPTION OF DRAWINGS

FIG. 6 is an explanatory diagram showing an example of position, name and function in principal CSR.

FIG. 7 is an explanatory diagram showing a structure example of plug control registers.

FIG. 8 is an explanatory diagram showing structure examples of bus info block, route directory, and unit directory.

FIGS. 9A–9D are explanatory diagrams showing structure examples of oMPR, oPCR, iMPR, and iPCR.

FIG. 12 is an explanatory diagram showing a data structure example of a descritor.

FIG. 13 is an explanatory diagram showing an example of generation ID in FIG. 12.

FIG. 14 is an explanatory diagram showing an example of the list ID in FIG. 12.

FIG. 19 is an explanatory diagram showing a specific example of the AV/C command.

FIGS. 20A–20B are explanatory diagrams showing a specific example of the command and response of the AV/C command.

FIG. 21 is an explanatory diagram showing a transmission example of the command according to the first mode for carrying out the present invention.

FIG. 22 is an explanatory diagram showing a setting example of a preset entry according to the first mode for carrying out the present invention.

FIG. 23 is an explanatory diagram showing an example of an output preset control command and its response according to the first mode for carrying out the present invention.

FIG. 24 is an explanatory diagram showing an example of an output preset status command and its response according to the first mode for carrying out the present invention.

FIG. 25 is an explanatory diagram showing an example of an input select control command and its response according to the first mode for carrying out the present invention.

FIG. 26 is an explanatory diagram showing an example of an input select status command and its response according to the first mode for carrying out the present invention.

FIG. 29 is an explanatory diagram showing an example of a signal source status command and its response according to the second mode for carrying out the present invention.

FIG. 30 is an explanatory diagram showing an example (in case of virtual output) of the signal source status command and its response according to the second mode for carrying out the present invention.

FIG. 31 is a flow chart showing a process example (example 1) of a rec. monitor according to the second mode for carrying out the present invention.

BEST MODE FOR CARRYING OUT THE INVENTION

A first embodiment of the present invention will be described below with reference to FIGS. 1 to 27.

Figure 1:
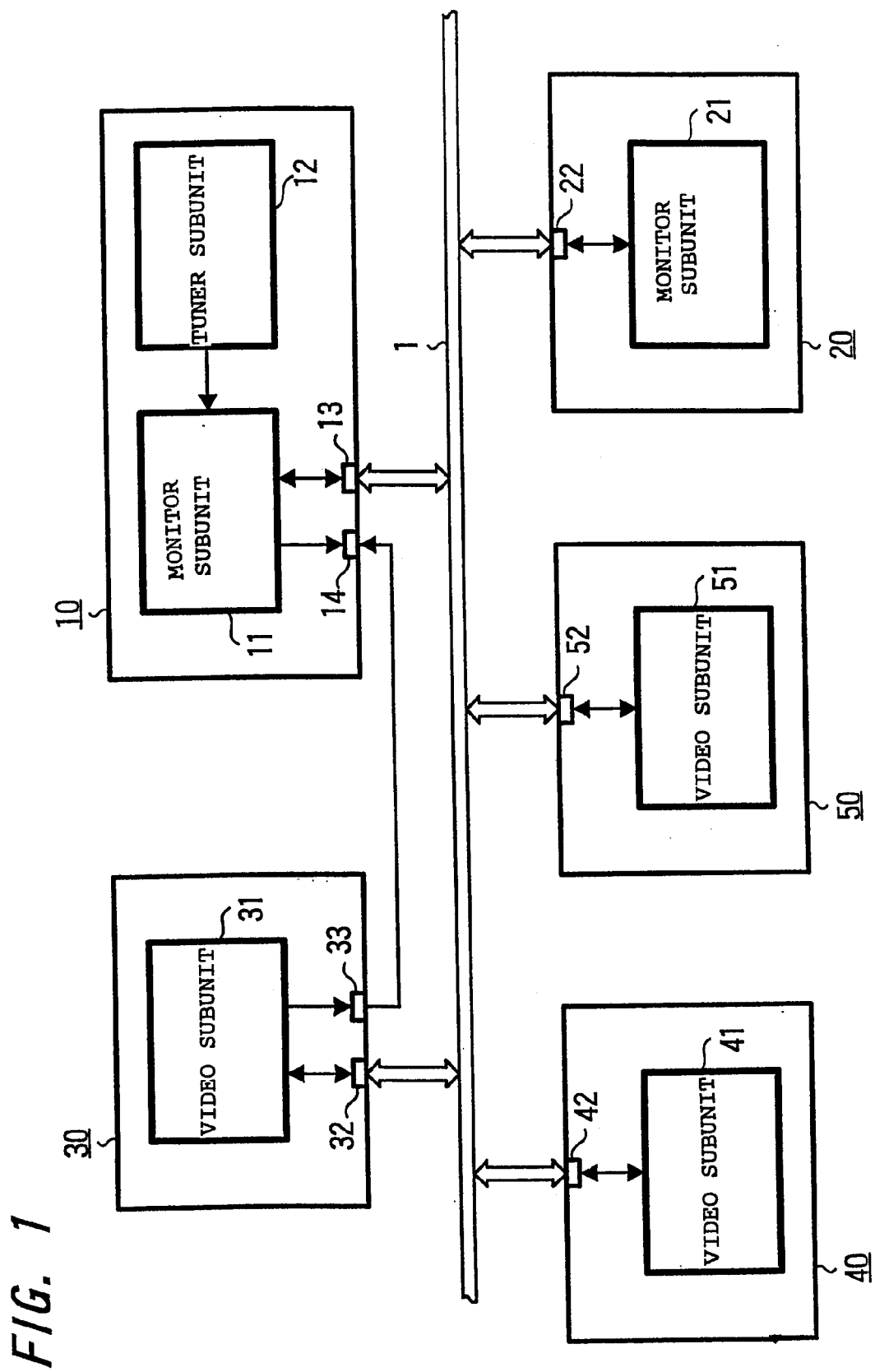
FIG. 1 is a block diagram showing an example of the system configuration according to a first embodiment of the present invention.

First of all, an example of the configuration of a network system to which the present invention is applied with reference to FIG. 1. This network system has a plurality of equipments connected through a serial data bus line according to the IEEE 1394 system (hereinafter merely referred to as "bus") which is a digital communication control bus. FIG. 1 shows an example in which five AV equipments 10, 20, 30, 40 and 50 are connected through the bus 1. The respective equipments connected to the bus 1 have herein terminals for connecting to the IEEE 1394 system bus which connects a first and a second video receivers 10 and 20 with a first, a second and a third video equipments 30, 40 and 50.

The first and second video receivers 10 and 20 include a monitor subunit 11 and 21 respectively to receive video data inputted from the outside for displaying it on a video display means. The first video receiver 10 includes a tuner subunit 12 which can also process to display the received video data.

The first, second and third video equipments 30, 40 and 50 record an input video data, etc. using a recording medium such as the video tape and reproduce the video data recorded in that medium for outputting.

Additionally, each of the equipments 10 to 50 connected to the bus 1 is herein called a unit. Between units, it is possible to mutually read and write information stored in each unit for control, using a descriptor prescribed in AV/C Digital Interface Command Set General Specification (hereinafter referred to as "AV/C") of AV/C Command Transaction Set. Each function of the unit is called a subunit. Communication between the subunit within each unit and the bus 1 is performed through a plug 13, 22, 32, 42 and 52 that each unit has. In this case, each plug has a plurality of output ports (output plugs) and input ports (input plugs) formed virtually so 1that communication can be made with a plurality of units simultaneously.

Each unit connected to the bus 1 is also called a node to which a node ID is given. A sender and a receiver of data on the bus is specified by the node ID. When a new unit is connected to the bus 1 or when it is detected that the connected unit is separated, the node ID is subjected to a bus reset and a processing to give the node ID again is performed. Therefore, if the bus reset occurs, the node ID of each unit may change.

Additionally, the first video unit 30 includes an analog output port 33 and the first video receiver unit 10 includes an analog input port 14 in this example. The analog output port 33 and the analog input port 14 are connected through an analog signal transmission line 2. When a signal reproduced from a recording medium at the first video unit 30 is an analog video signal, this signal is transmitted to the first video receiver unit 10 through the analog signal transmission line 2. Data transmitted through the bus 1 such as video data are all digital data. In this case, on the recording medium handled by the first video unit 30, there may sometimes be recorded the mixture of digital data and analog data. For example, there may also be a case where on the way of reproduction from a recording medium the reproduction of data changes from that of digital data to that of analog signal.

Figure 2:
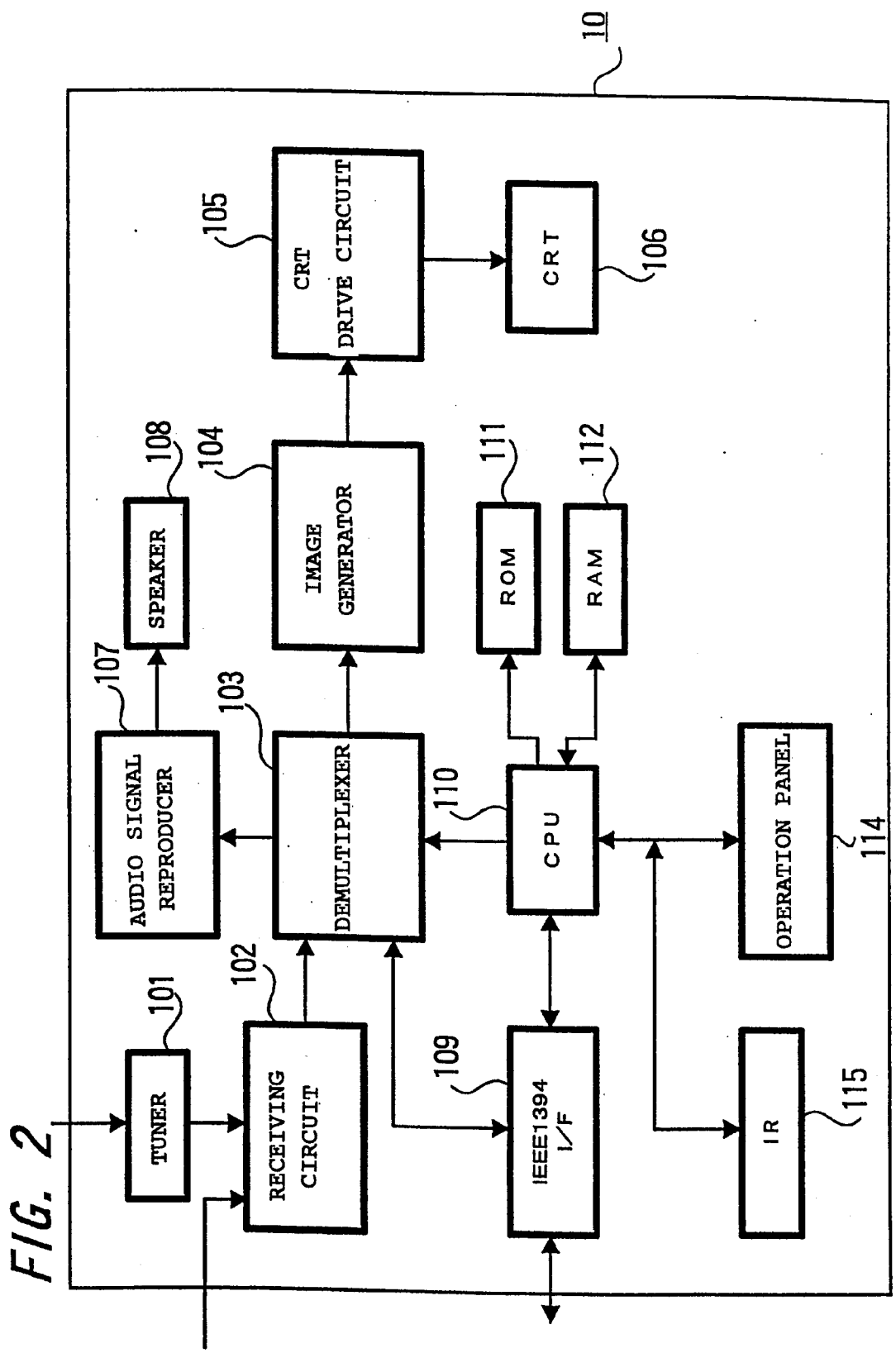
FIG. 2 is a block diagram showing a structure example of a video receiver.

In this context, structure examples of the video receiver and the video equipment will be described. FIG. 2 is a block diagram showing a structure example of the first video receiver 10. Digital broadcast data received through a predetermined channel by a tuner 101 to which an antenna (not shown) is connected are supplied to a receiving circuit 102 for decoding. The decoded broadcast data is supplied to a demultiplexer 103 for separating video data from audio data. The separated video data is supplied to an image generator 104 for processing to receive an image. According to the processed signal, a CRT drive circuit 105 drives a cathode ray tube (CRT) 106 to make it display the image. Also, audio data separated by the demultiplexer 103 is supplied to an audio signal reproducer 107 which performs an audio processing such as conversion to analog and amplification. The processed audio signal is supplied to a speaker 108 for outputting.

Moreover, the video receiver 10 includes an interface 109 for connecting it to an IEEE1394 type bus. Video data and audio data acquired from the IEEE1394 type bus side to the interface 109 are supplied to the demultiplexer 103 for enabling the image to be displayed at CRT 106 and the audio to be outputted from the speaker 108. Further, video data and audio data received by the tuner 101 are supplied from the demultiplexer 103 to the interface 109 for transmitting them to the IEEE1394 type bus side. Also, an analog video signal and an analog audio signal can be inputted to the receiving circuit 102 from the outside.

The display processing in the video receiver 10 and the transmission processing through the interface 109 are performed under the control of a central processing unit (CPU) 110. To the CPU 110 are connected a memory 111 which is a ROM storing a program necessary for control, etc. and a memory 112 which is a work RAM. Also, to the CPU 110 are supplied operating information from an operation panel 114 and control information from a remote control device whose infrared light receiver 115 receives, so that an operation control corresponding to the operating information and control information is performed.

Furthermore, when the interface 109 receives control data such as command and its response according to the AV/C command stated below through the IEEE1394 type bus, those data are supplied to the CPU 110 for enabling the CPU 110 to perform the corresponding operation control. Transmission of the command and its response from the interface 109 is also performed under the control of the CPU 110.

Data necessary for the control is stored in the memory 112 and the like connected to the CPU 110.

Figure 3:
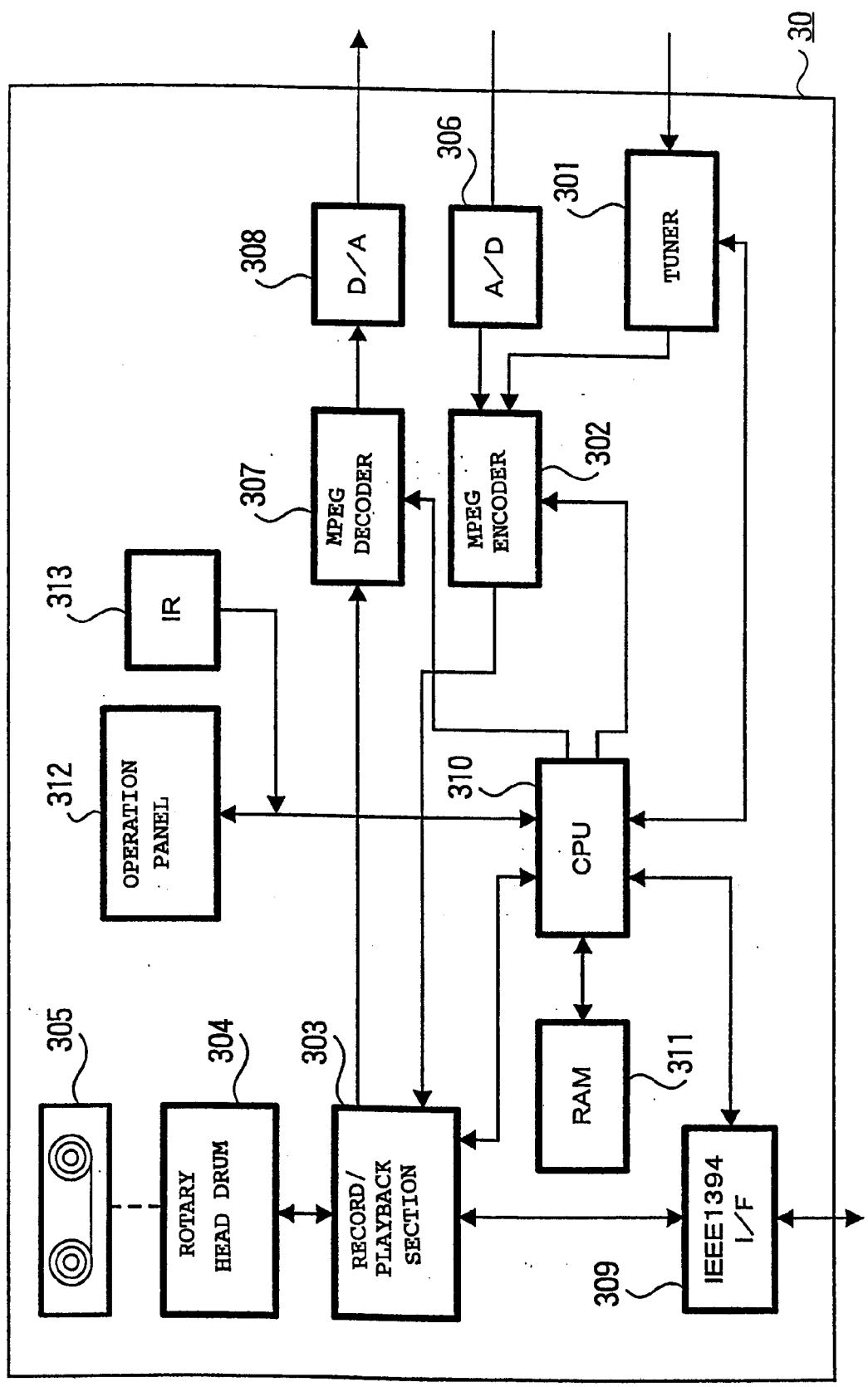
FIG. 3 is a block diagram showing a structure example of a video equipment.

FIG. 3 is a block diagram showing a structure example of the first video equipment 30 formed as a digital video cassette recorder (DVCR).

In a recording system configuration, digital broadcast data received through a predetermined channel by a tuner 301 built in the video equipment 30 is supplied to a MPEG (moving Picture Experts Group) encoder 302 which converts them into video data and audio data of a format suitable for recording such as a MPEG2 format. When the received broadcast data has the MPEG2 format, the encoder 302 performs no processing.

Data encoded by the MPEG encoder 302 is supplied to a record/playback section 303 for record processing and the processed data to be recorded is supplied to a recording head within a rotary head drum 304 for causing the data to be recorded in a magnetic tape within a tape cassette 305.

Analog video and audio signals inputted from the outside are converted into digital data by an analog/digital converter 306 and then converted into, e.g. MPEG2 type video and audio data by the MPEG encoder 302. The resulting data are supplied to the record/playback section 303 for record processing and the processed data to be recorded are supplied to the recording head within the rotary head drum 304 for causing them to be recorded in the magnetic tape within the tape cassette 305.

In playback system configuration, a signal obtained by playing back the magnetic tape within the tape cassette 305 by the rotary head drum 304 is processed to reproduce video and audio data by the record/playback section 303. These video and audio data are supplied to the MPEG decoder 307 for decoding, e.g. from the MPEG2 format. The decoded data are supplied to a digital/analog converter 308 for converting them into analog video and audio signals which are outputted to the outside.

Moreover, the video equipment 30 includes an interface 309 for connecting it to the IEEE1394 type bus. Video and audio data inputted from the IEEE1394 type bus side to the interface 309 are supplied to the record/playback section 303 for enabling them to be recorded in the magnetic tape within the tape cassette 305. Also, video and audio data reproduced from the magnetic tape within the tape cassette 305 are supplied from the record/playback section 303 to the interface 309 for transmitting them to the IEEE1394 type bus side.

In transmission through the interface 309, when a format of data recorded in a medium (magnetic tape) in the video equipment 30 (e.g. the above described MPEG2 format) differs from a format of data transmitted through the IEEE1394 type bus, a format conversion may be performed by a circuit within the video equipment 30.

The record processing and playback processing within the video equipment 30 as well as the transmission processing through the interface 309 are performed under the control of the central processing unit (CPU) 310, to which a memory 311 that is a work RAM is connected. Further, operating information from an operation panel 312 and control information from a remote control device whose infrared light receiver 313 receives are supplied to the CPU 310, which performs an operation control corresponding to the operating information and control information.

When the interface 309 receives control data such as command and its response according to the AV/C command stated below through the IEEE1394 type bus, those data are supplied to the CPU 310, which is enabled to perform the corresponding operation control. The transmission of command and its response from the interface 309 is also performed under the control of the CPU 310. Data necessary for the control is stored in the memory 311, etc. connected to the CPU 310.

Additionally, structures of the second video receiver 20, the second and third video equipment 40 and 50 are not described herein, but they are basically the same as those of the video receiver 10 and the video equipment 30 shown in FIG. 2 and FIG. 3.

Next, a data transmission status on the IEEE1394 type bus 1 to which the equipment 10 to 50 are connected will be described.

Figure 4:
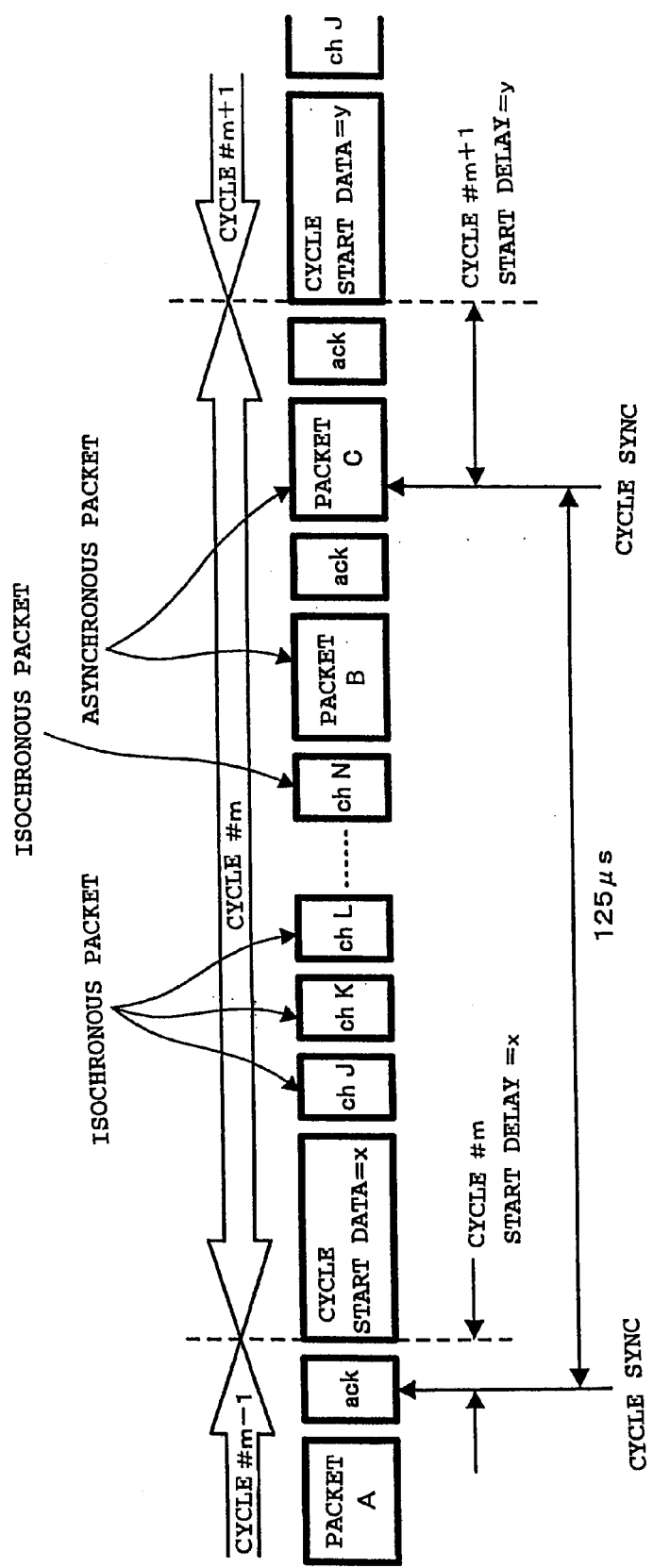
FIG. 4 is an explanatory diagram showing a frame structure example prescribed in the IEEE1394 standard.

FIG. 4 is a diagram showing a cycle structure in data transmission among equipments connected to each other by the IEEE1394 bus. In the IEEE1394 system, data is divided into packets which are transmitted on a timesharing basis in a cycle of 125 μs as a reference. This cycle is created by a cycle-start signal supplied from a node having a cycle master function (any one of equipments connected to the bus). Isochronous packets have a secured bandwidth required for transmission (This is a time length, but is termed a bandwidth) starting from the head of each cycle. Thus, in an isochronous transmission, data transmission within a fixed time period is ensured. However, no acknowledgement is made from the receiving side. Thus, if a transmission error occurs, there is no protection mechanism and data will be lost. In an asynchronous transmission in which a node securing the bus as the result of arbitration transmits asynchronous packets during a time period which is not used for the isochronous transmission in each cycle, a reliable transmission is ensured by making acknowledgement and using retry, but transmission timing will be uncertain.

Independent channel numbers 0, 1, 2, . . . , 63 are given to each isochronous packets (Iso packet) in one communication cycle shown in FIG. 4 for enabling to discriminate among a plurality of Iso transmission data. These are isochronous channels, for which sixty-four channels are prepared herein. A channel No.63 is a broadcast channel which can be received by any equipment. The other channels are channels through which data is transmitted between specific equipments after a connection is established. Additionally, any channel other than the channel No.63 may be used as the broadcast channel.

A time period from completion of Iso packet communication to the next cycle-start packet is used for an asynchronous packet (Async packet) transmission. Thus, a time period during which the Async packets can be transmitted will change depending on the number of transmission channels of Iso packet at that time. The Iso packet transmission is a transmission method in which a reserved bandwidth (the number of channels) in each communication cycle is secured, but no acknowledgment is made from the receiving side. In the Async packet transmission, the receiving side is caused to return acknowledgment (Ack) data, thereby confirming the transmission status so that a reliable transmission can be performed.

In order that a predetermined node performs the isochronous transmission, that node must correspond to an isochronous function. Moreover, at least one of nodes which correspond to the isochronous function must have the cycle master function. Furthermore, at least one of nodes connected to the IEEE1394 serial bus must have the function of an isochronous resource manager.

In the network system formed by connecting through the IEEE1394 type bus 1, each equipment has a node ID in addition to a node unique ID given individually to each equipment. This node ID is collected from each equipment under the control of a controller provided on the network, when a bus reset occurs, for example, when a new equipment is connected to the bus 1 or any equipment is separated from the bus 1.

Figure 5:
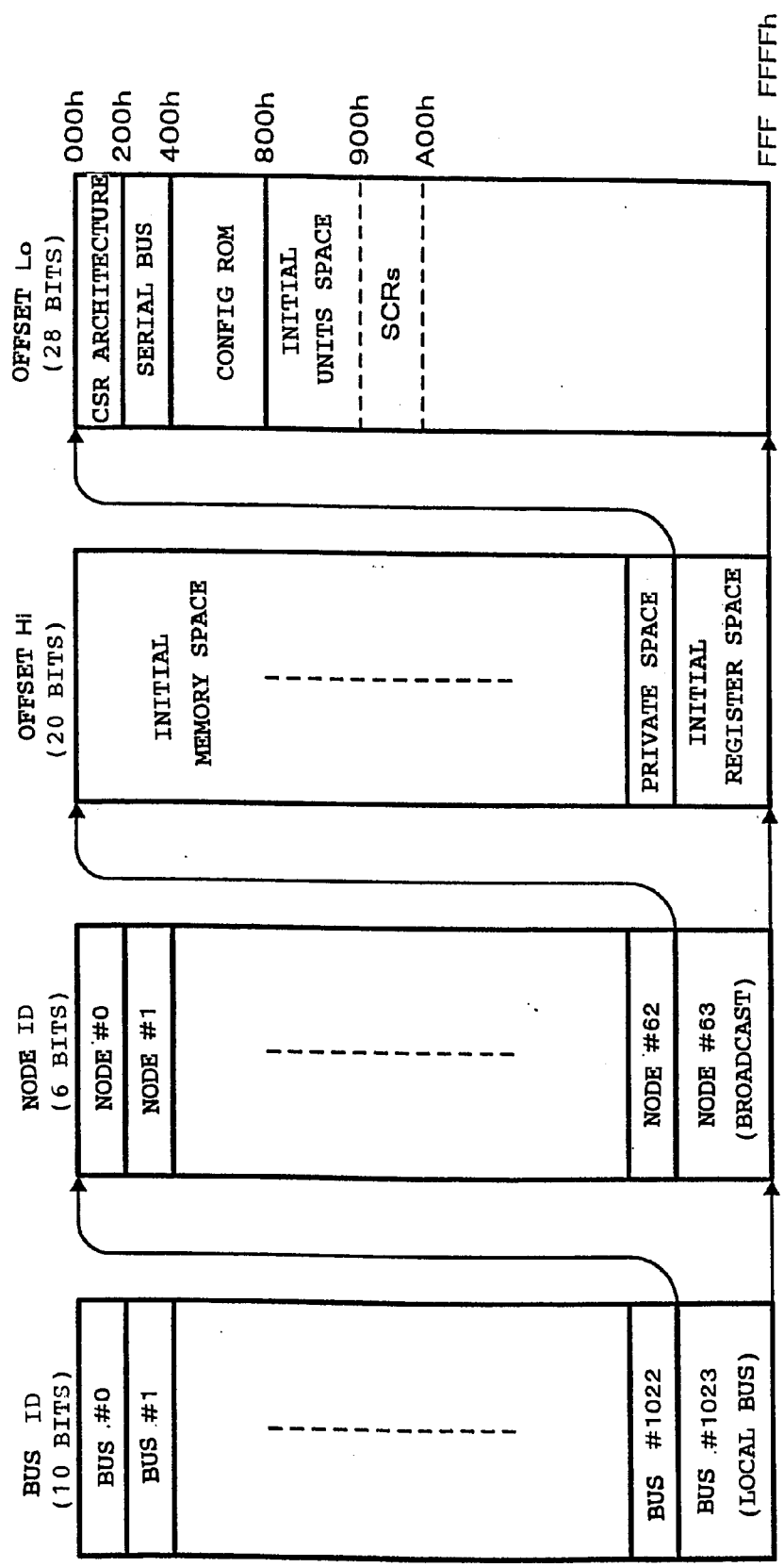
FIG. 5 is an explanatory diagram showing a structure example of address space of CSR architecture.

The IEEE1394 is based on CSR (Control and Status Resister) architecture having a 64 bit address space prescribed in ISO/IEC13213. FIG. 5 is a diagram for explaining the structure of the address space of CSR architecture. Upper 16 bits are the node ID indicating nodes on each IEEE1394. The remaining 48 bits are used to specify the address space afforded to each node. The upper 16 bits are further divided into 10 bits of bus ID and 6 bits of physical ID (node ID in a narrow sense). Since a value in which all the bits are one is used for a special purpose, 1023 buses and 63 nodes can be specified. When the bus reset occurs, the node ID is given anew. The bus reset occurs when there is a change in any constituent equipment connected to the bus 1. For example, when any one equipment connected to the bus 1 is separated, or when it is recognized that new equipment is connected to the bus 1, the bus reset is executed.

Of the address space defined by the lower 48 bits, the address space defined by the upper 20 bits is divided into an initial register space used for a register of 2048 bytes peculiar to CSR, a register peculiar to IEEE1394 and the like, an private space, an initial memory space and so on. The space defined by the lower 28 bits is used as a configuration ROM, an initial unit space used for a purpose peculiar to the node, a plug control register (PCR) and so on, when the space defined by its upper 20 bits is the initial register space.

FIG. 6 is a diagram for explaining offset addresses, names and functions of principal CSRs. An offset in FIG. 6 indicates an offset address from FFFFF0000000h address (a number whose end has "h" attached thereto represents the hexadecimal number) at which the initial register space begins. A bandwidth available register having the offset of 220h is a register used for assigning the bandwidth and indicates the bandwidth assignable to the isochronous communication. Only a value of a node operating as an isochronous resource manager is made to be valid. Each node has the CSR in FIG. 5, but as far as the bandwidth available register is concerned, what is possessed only by the isochronous resource manager is made to be valid. In other words, the bandwidth available register is substantially possessed only by the isochronous resource manager. When no bandwidth is assigned to the isochronous communication, the maximum value is preserved in the bandwidth available register. Each time the bandwidth is assigned, that value diminishes. Channels available registers of the offsets 224h to 228h are registers used for assigning channels.

Each bit thereof corresponds to channel No.0 to No.63, respectively. When a bit is zero, the bit indicates that the corresponding channel has already been assigned. Only the channels available register of a node operating as the isochronous resource manager is valid.

Referring again to FIG. 5, between the addresses 400h and 800h within the initial register space is arranged a configuration ROM based on a general ROM format. In the configuration ROM are arranged a bus info block, a root directory, and a unit directory.

In order to control the input and output of the equipment through an interface, the node has PCR (plug control register) prescribed in IEC1883 between the addresses 900h and 9FFh within the initial unit space in FIG. 5. This is such that the concept of plug is substantiated in order to form a signal route theoretically similar to the analog interface. FIG. 7 is a diagram for explaining the structure of PCR. The PCR includes oPCR (output plug control register) representing an output plug and iPCR (input plug control register) representing an input plug. The PCR also includes registers of oMPR (output master plug register) and iMPR (input master plug register) for indicating information on the output plug or input plug which is inherent in each equipment. Each equipment does not have a plurality of oMPRs and a plurality of iMPRs, but may have a plurality of oPCRs and iPCRs corresponding to each plug depending on the capability of the equipment. The PCR shown in FIG. 7 has thirty-one oPCRs and iPCRs, respectively. An isochronous data stream is controlled by operating registers corresponding to these plugs.

FIG. 8 is a diagram showing details of the bus info block, the root directory and the unit directory. Company ID in the bus info block has an ID number stored therein which indicates a manufacturer of the equipment. Chip ID stores a unique ID in the world, which is inherent in that equipment and does not overlap the other equipment. A node unique ID which is an identification number inherent in each equipment is created using these company ID and chip ID. In accordance with the IEC1833 standard, "00h" is written into the first octet of a unit spec ID of the unit directory of the equipment satisfying the IEC1833; "A0h" is written into the second octed thereof; and "2Dh" is written into the third octed thereof, respectively. Further, into the first octed of a unit switch version is written "01h", and into LSB (least significant bit) of the third octed is written "1".

FIG. 9 is a diagram showing structures of oMPR, oPCR, iMPR and iPCR. FIG. 9A shows the structure of oMPR; FIG. 9B shows the structure of oPCR; FIG. 9C shows the structure of iMPR; and FIG. 9D shows the structure of iPCR. Data rete capability of two bits on the MSB side of oMPR and iMPR stores a code indicating the maximum transmission speed of isochronous data which can be transmitted or received by the equipment. Broadcast channel base of the oMPR prescribes a channel number used in a broadcast output. Number of output plugs of five bits on the LSB side of oMPR stores the number of output plugs possessed by that equipment, namely, a value indicating the number of oPCR. Number of input plugs of five bits on the LSB side of iMPR stores the number of input plugs possessed by that equipment, namely a value indicating the number of iPCR. Persistent extension field and non-persistent extension field are areas which are defined for future extension.

On-line at MSB of the oPCR and iPCR indicates the use of the plug. Specifically, its value of 1 indicates that the relevant plug is on-line and its value of 0 indicates that it is off-line. Each value of broadcast connection counters of the oPCR and iPCR indicates that there is a broadcast connection (1) or that there is no broadcast connection (0). Each value of point-to-point connection counters of six bits in the oPCR and iPCR indicates the number of point-to point connections owned by the relevant plug. The point-to-point connection means a connection for performing transmission between a specific node and another specific node only.

Each value of channel numbers having a six-bit width in the oPCR and iPCR indicates an isochronous channel number to which the relevant plug is connected. A value of data rate having a two-bit width in the oPCR indicates a real transmission speed of isochronous data packets outputted from the relevant plug. A code which is stored in overhead ID having a four-bit width in the oPCR indicates an over bandwidth of isochronous communication. A value of payload having ten-bit width in the oPCR represents the maximum value of data contained by the isochronous packets that the relevant plug can handle.

Figure 10:
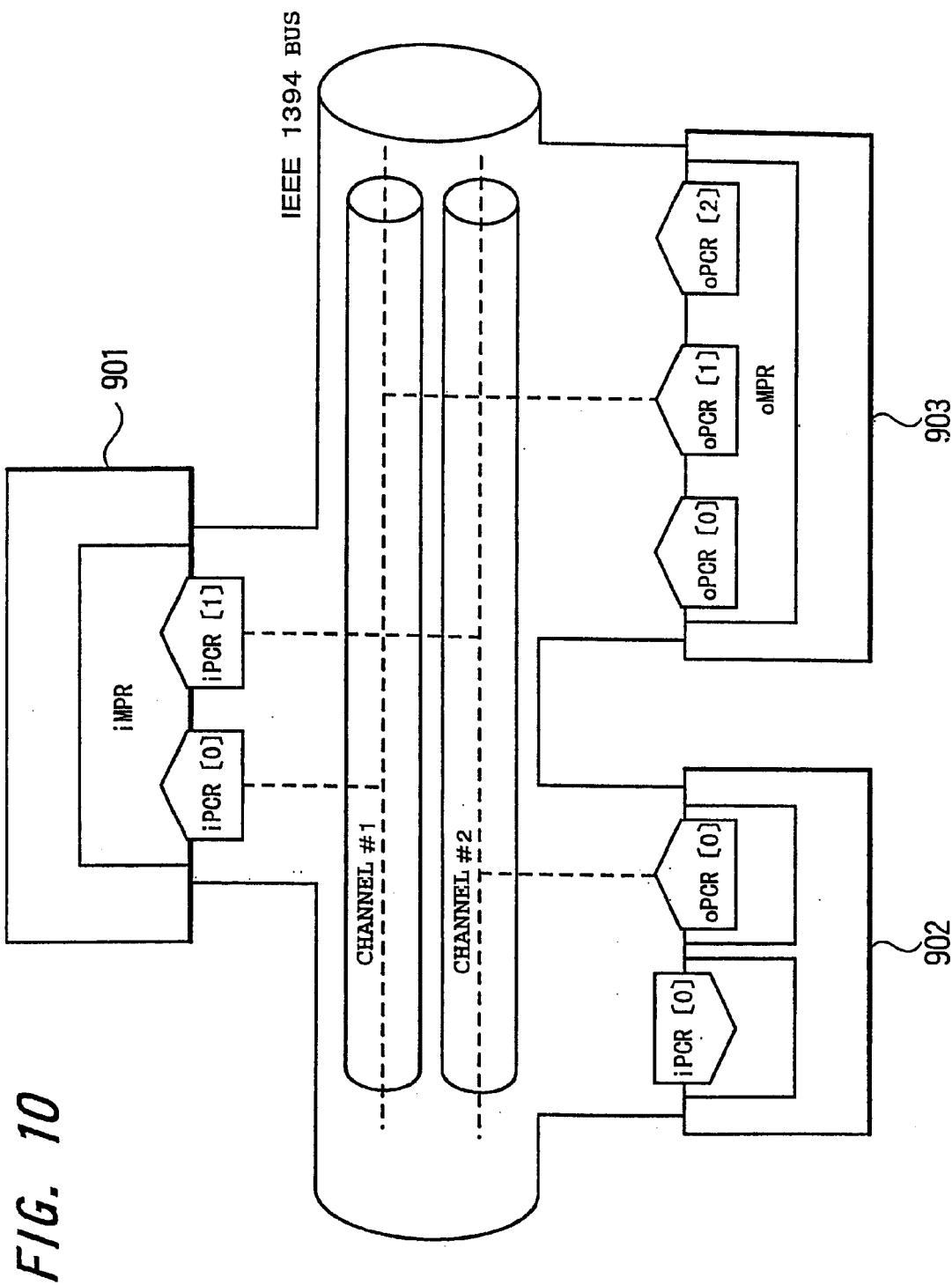
FIG. 10 is an explanatory diagram showing an example of the relation among plugs, plug control registers, and transmission channels.

FIG. 10 is a diagram showing the relation among the plug, the plug control register and the isochronous channel. In this diagram, equipments connected through the IEEE1394 type bus are shown as AV-devices 901 to 903. Of oPCR[0] to oPCR[2] whose transmission speed and the number of oPCRs are defined by oMPR of the AV-device 903, oPCR[1] specifies a channel for isochronous data, which is transmitted to a channel #1 of the IEEE1394 serial bus. The iMPR of the AV-device 901 defines the transmission speed and the number of iPCR of iPCR[0] and iPCR[1]. Through iPCR[0] of iPCR[0] and iPCR[1], the AV-device 901 reads the isochronous data transmitted to the channel #1 of the IEEE1394 serial bus. Likewise, the AV-device 902 transmits isochronous data to a channel #2 specified by oPCR[0], and the AV-device 901 reads the isochronous data from the channel #2 specified by iPCR[1].

In this manner, data transmission takes place among equipments connected through the IEEE1394 serial bus. In this system, the AV/C command set defined as commands for controlling equipments connected through the IEEE1394 serial bus is utilized for enabling the control of the equipments, the estimation of their conditions and the like to be performed. This AV/C command set will be described next.

Figure 11:
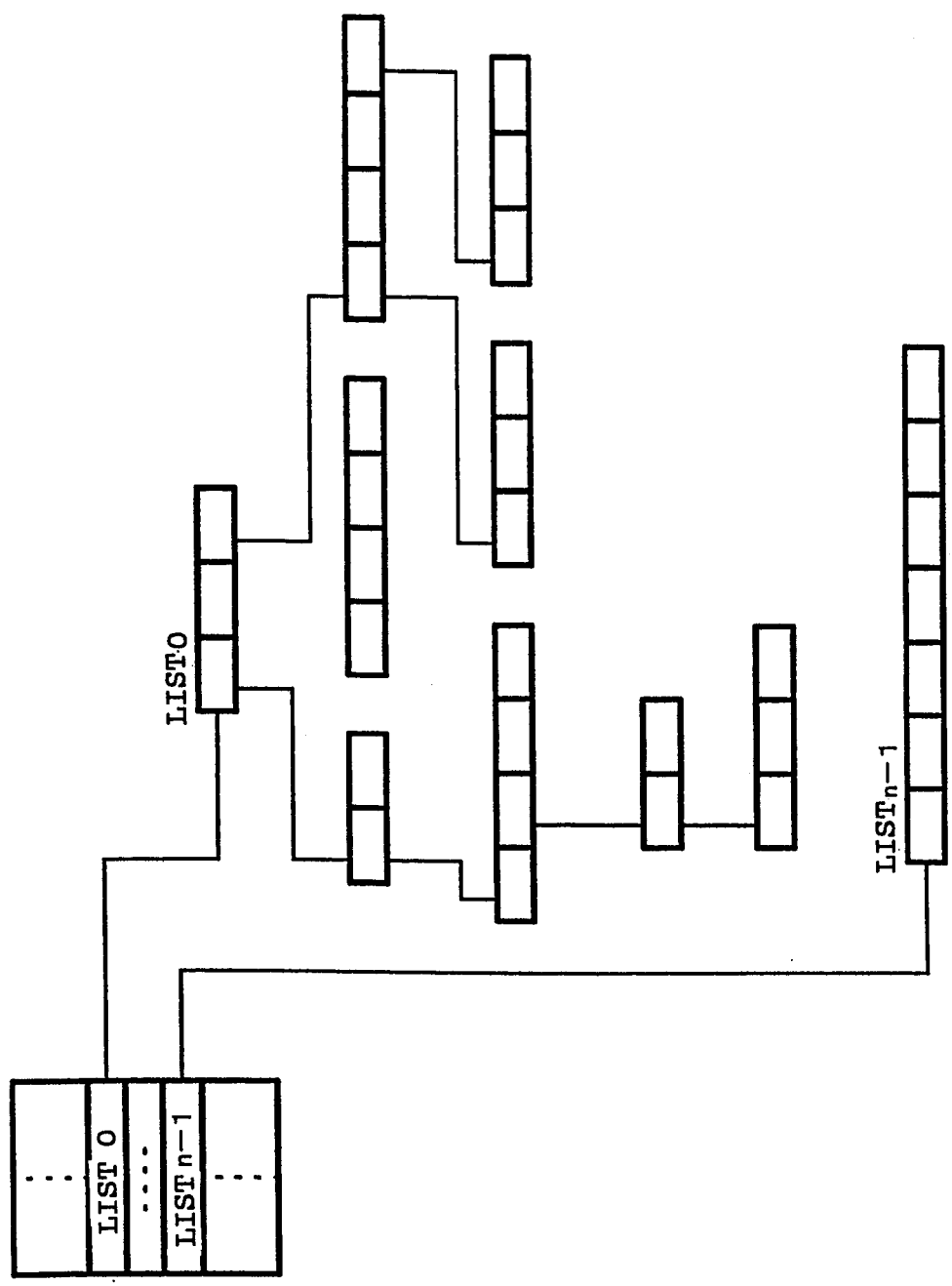
FIG. 11 is an explanatory diagram showing a data structure example according to a hierarchical structure of a descriptor.

First of all, the data structure of a subunit identifier descriptor in the AV/C command set used in this system will be described in reference to FIG. 11 to FIG. 14. FIG. 11 shows the data structure of the subunit identifier descriptor. As shown in FIG. 11, the subunit identifier descriptor is formed by lists of hierarchical structure. The list represents, for example, a channel which can be received, in case of a tuner, a tune which is recorded therein, in case of a disk, and so on.

The list on the top layer of the hierarchical structure is termed a root list. For example, a list 0 forms a root relative to the lower lists. Other lists form the root lists as well. The root lists exist as many as the number of objects. In this connection, for example, if an AV-device connected to the bus is a tuner, the object means each channel or the like in digital broadcast. Further, all lists on one layer share common information.

FIG. 12 shows a format of a general subunit identifier descriptor. The subunit identifier descriptor has attribute information on functions described therein as its contents. A descriptor length field does not include a value of the field itself. Generation ID shows a version of the AV/C command set and its value is, e.g."00h" (h represents that it is hexadecimal). In this case, "00h" means, as shown in FIG. 13 for example, that data structure and command correspond to a version 3.0 in the AV/C General Specification. In addition, all values except "00h" are reserved for future specification.

Size of list ID indicates the number of bytes of list ID. Size of object ID indicates the number of bytes of object ID. Size of object position indicates a position (the number of bytes) in a list used when it is referred to during control operation. Number of root object list indicates the number of root object lists. Root object list ID shows an ID for identifying the top root object list on the respective independent layers.

Subunit dependent length indicates the number of bytes in a subsequent subunit dependent information field. Subunit dependent information field is a field showing information which is inherent to function. Manufacturer dependent length indicates the number of bytes in a subsequent manufacturer dependent information field. Manufacturer dependent information field is a field showing information on specification of vendor (manufacturer). Additionally, if there is no manufacturer dependent information in the descriptor, this field will not exist.

FIG. 14 shows assignment ranges of the list ID value shown in FIG. 12. As shown in FIG. 14, "0000h to 0FFFh" and "4000h to FFFFh" are reserved as assignment ranges for future specification. "1000h to 3FFFh" and "10000h to max list ID value" are prepared for identifying function type dependent information.

Figure 15:
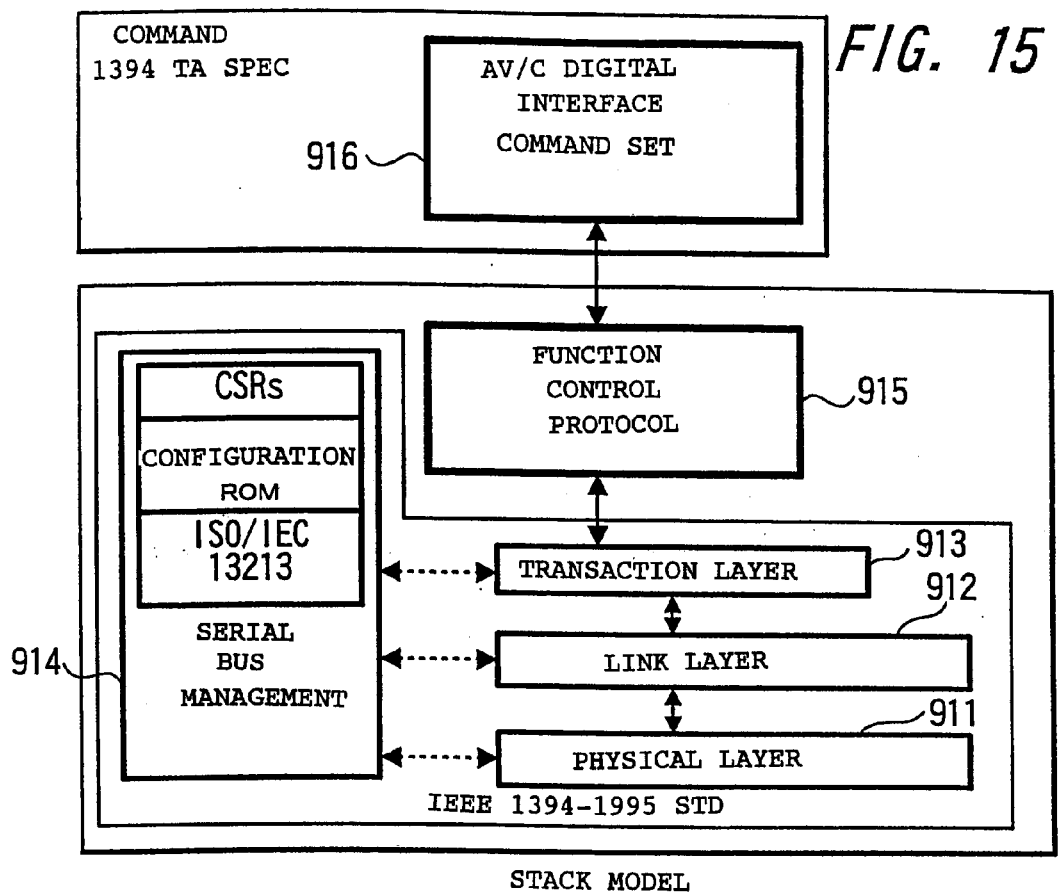
FIG. 15 is an explanatory diagram showing a stack model example of the AV/C command.

Next, the AV/C command set used in the system according to this embodiment will be described with reference to FIG. 15 to FIG. 20. FIG. 15 shows a stack model of the AV/C command set. As shown in FIG. 15, physical layer 911, link layer 912, transaction layer 913 and serial bus management 914 are based on the IEEE 1394 standard. FCR (function control protocol) 915 is based on IEC 61883. The AV/C command set 916 is based on 1394TA specification.

Figure 16:
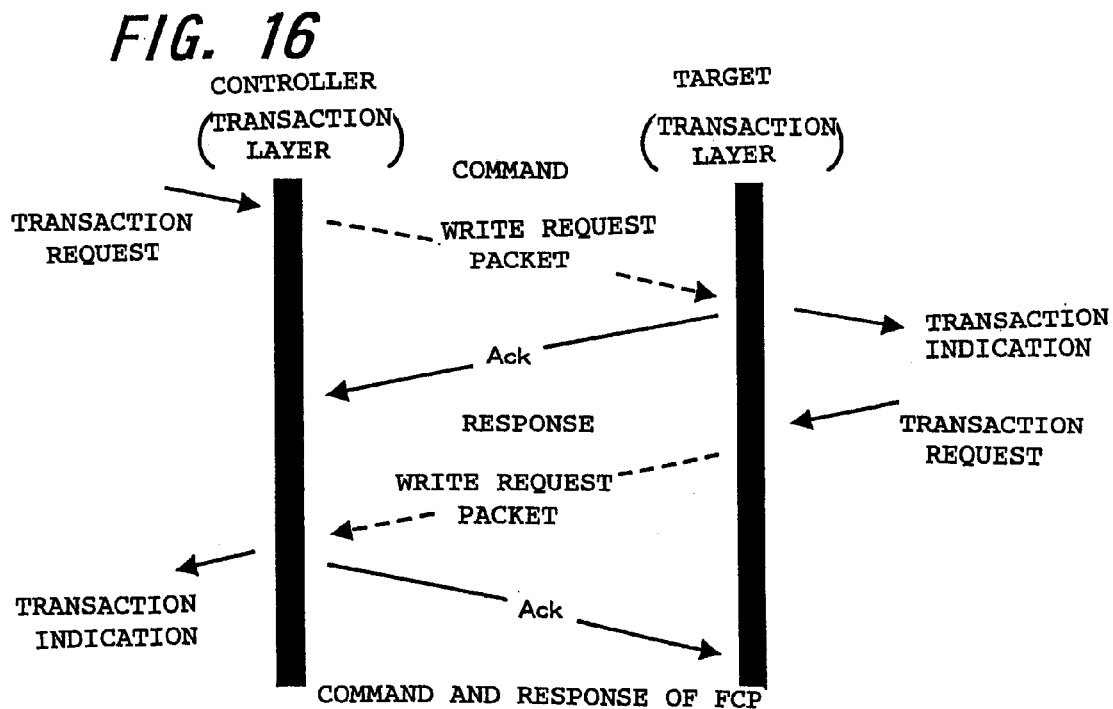
FIG. 16 is an explanatory diagram showing an example of the relation between the command and response of the AV/C command.

FIG. 16 is a diagram for explaining the command and its response of FCP 915 in FIG. 15. The FCP is a protocol for controlling equipments (nodes) on the IEEE 1394 type bus. As shown in FIG. 16, a controlling side is a controller and a controlled side is a target. Command transmission or response of the FCP takes place between nodes using write transaction of asynchronous communication under the IEEE1394. The target which has received data returns acknowledgement to the controller for confirming the reception.

Figure 17:
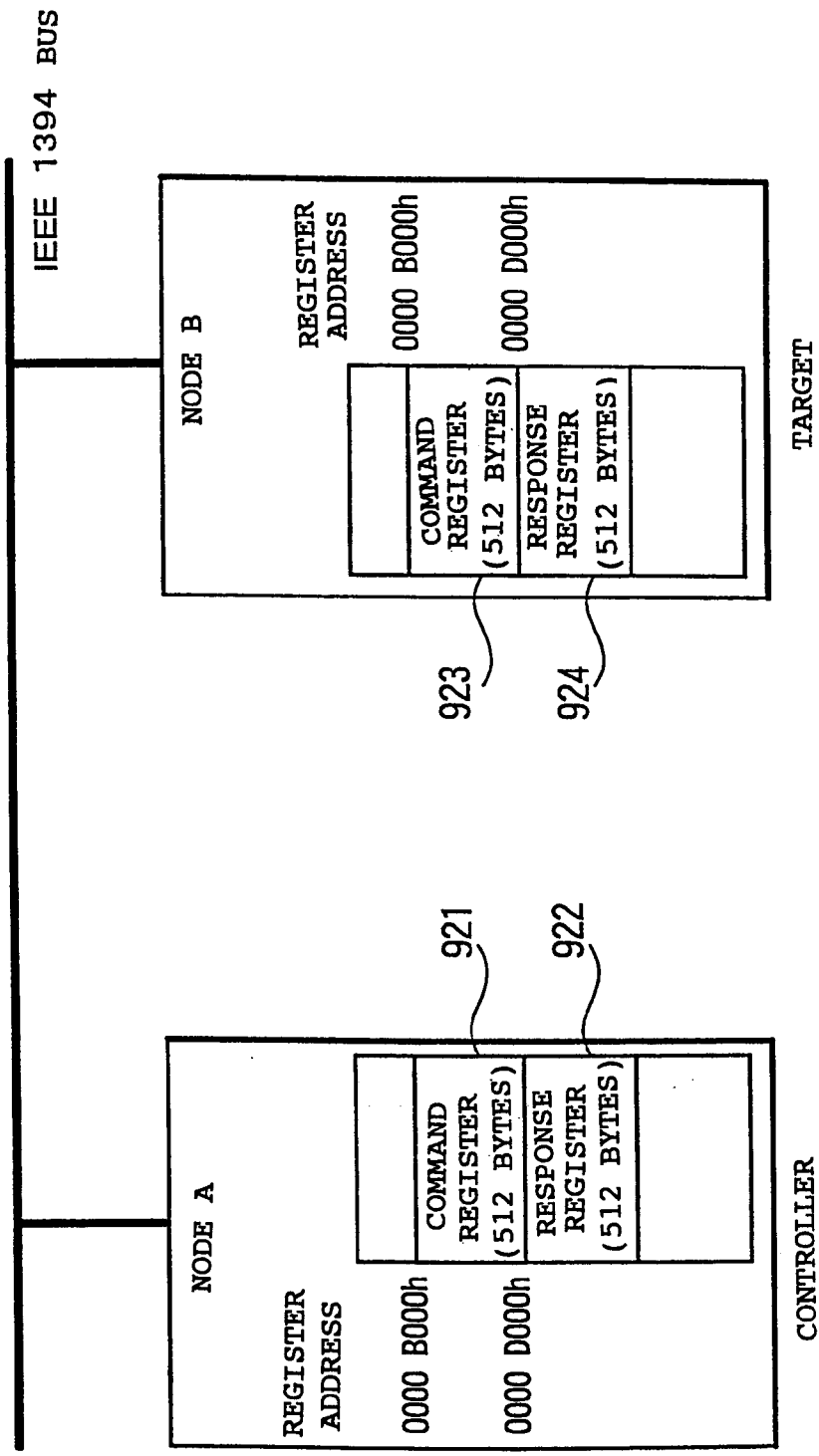
FIG. 17 is an explanatory diagram showing in more detail an example of the relation between the command and response of the AV/C command.

FIG. 17 is a diagram for explaining in more detail the relation between the command and its response of FCP shown in FIG. 16. A node A is connected to a node B through the IEEE1394 bus. The node A is a controller and the node B is a target. A command register of 512 bytes and a response register of 512 bytes are prepared in both of the node A and node B, respectively. As shown in FIG. 17, the controller transmits instructions to the target by writing a command message into the command register 923 thereof. Inversely, the target responds to the controller by writing a response message into the response register 922 thereof. With respect to the above two messages, control information is exchanged. The kind of the command set transmitted by FCP is described in CTS within a data field of FIG. 18, which is described below.

Figure 18:
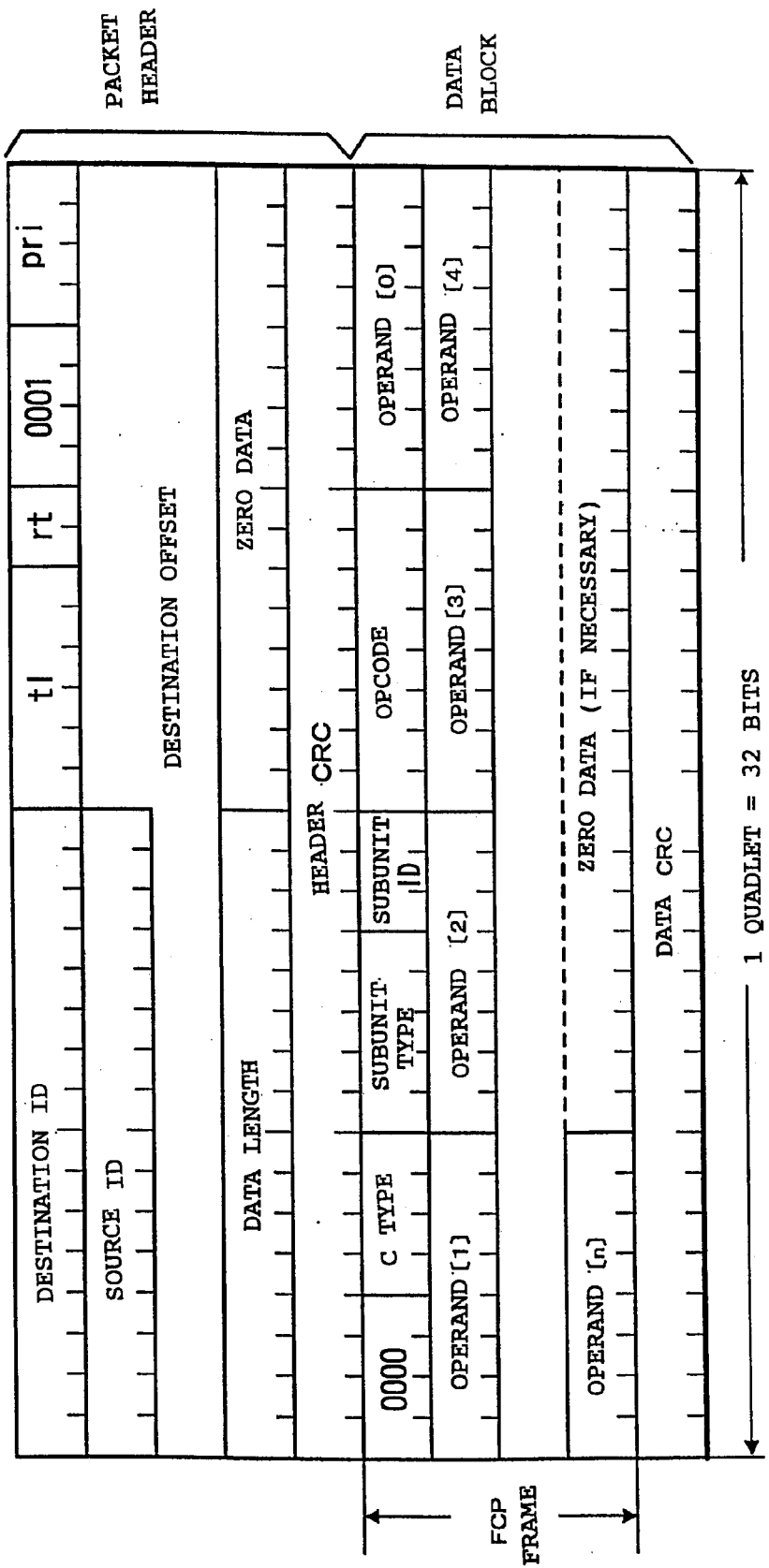
FIG. 18 is an explanatory diagram showing a data structure example of the AV/C command.

FIG. 18 shows a data structure of a packet transmitted in the asynchronous transmission mode of the AV/C command. The AV/C command set is a command set for controlling AV equipments and CTS (command set ID)="0000". AV/C command frames and response frames are exchanged between nodes using the FCP. It is arranged that the response to command should be performed within 100 ms so as to avoid burdening the bus and AV equipments. As shown in FIG. 18, data of the asynchronous packet is comprised of 32 bits (=1 quadlet) in a horizontal direction. An upper part of the drawing shows a heater portion of a packet and a lower part of the drawing shows a data block. Destination ID indicates the destination.

CTS indicates a command set ID. For AV/C command set, CTS="0000". The field of ctype/response indicates a functional classification of the command if the packet is the command, and indicates a processed result of the command if the packet is the response. The command is roughly divided into four kinds. They are defined as (1) a command for controlling functions from the outside (CONTROL), (2)

a command for inquiring the status from the outside (STATUS), (3) a command for inquiring from the outside whether the control command is supported or not (GENERAL INQUIRY (whether opcode and operands are supported or not)), (4) a command for requiring to notify a change in status to the outside (NOTIFY).

The response will be returned depending on the kind of command. The response to the CONTROL command includes "NOT IMPLEMENTED", "ACCEPTED", "REJECTED" and "INTERIM". The response to the STATUS command includes "NOT IMPLEMENTED", "REJECTED", "IN TRANSITION" and "STABLE". The response to the command for inquiring from the outside whether the command is supported or not (GENERAL INQUIRY and SPECIFIC INQUIRY) includes "IMPLEMENTED" and "NOT IMPLEMENTED". The response to the command for requiring to notify a change in status to the outside (NOTIFY) includes "NOT IMPLEMENTED", "REJECTED", "INTRIM" and "CHANGED".

Subunit type is provided to specify functions within the equipments, to which, e.g. tape recorder/player, tuner and the like are assigned. To this subunit type is also assigned BBS (bulletin board subunit) which is a subunit used for laying information open to other equipments. In order to distinguish a plurality of subunits of the same kind, addressing is performed using subunit ID as a distinguishing number. Opcode which is a code of operation represents a command and operand represents a parameter of the commend. A field which is added if necessary (additional operands) is also prepared. Following the operands, zero data and the like is added if necessary. Data CRC (cyclic redundancy check) is used to check error in data transmission.

FIG. 19 shows a specific example of the AV/C command. The left side of FIG. 19 shows a specific example of command type/response. The upper part of that portion represents the command and the lower part of that portion represents the response. The CONTROL command is assigned to "0000". The STATUS command is assigned to "0001". The SPECIFIC INQUIRY command is assigned to "0010". The NOTIFY command is assigned to "0011". The GENERAL INQUIRY command is assigned to "0100". "0101 to 0111" are reserved for future specification. The NOT IMPLEMENTED response is assigned to "1000". The ACCEPTED response is assigned to "1001". The REJECTED response is assigned to "1010". The IN TRANSITION response is assigned to "1011". The IMPLEMENTED/STABLE response is assigned to "1100". The CHANGED response is assigned to "1101". The INTERIM response is assigned to "1111". "1110" is reserved for future specification.

The middle of FIG. 19 shows specific examples of the subunit types. A video monitor is assigned to "00000". A disc recorder/player is assigned to "00011". A tape recorder/player is assigned to "00100". A tuner is assigned to "00101". A video camera is assigned to "00111". The BBS used as a bulletin board (bulletin board subunit) is assigned to "01010". A subunit type which is unique to vendor (vendor unique) is assigned to "11100". A specific subunit type is assigned to "11110". Additionally, a unit is assigned to "11111", which is used when destination is an equipment (unit) itself. For example, on/off of power supply and the like can be cited.

The right side of FIG. 19 shows specific examples of opcodes (operation codes). Each subunit type has its own opcode table. Opcodes when the relevant subunit type is a tape recorder/ player are shown in the drawing. The operands are defined in each opcode. In this example, to "00h" is assigned a value which is unique to manufacturer (VENDOR DEPENDENT); to "50h" is assigned SEARCH MODE; to "51h" is assigned TIMECODE; to "52h" is assigned ATN; to "60h" is assigned OPEN MEMORY; to "61h" is assigned READ MEMORY; to "62h" is assigned WRITE MEMORY; to "C1h" is assigned LOAD; to "C2h" is assigned RECORD; to "C3h" is assigned PLAYBACK; and to "C4h" is assigned REWIND.

FIG. 20 shows specific examples of the AV/C command and its response. For example, when instructing a reproducing equipment as the target (consumer) to play back, the controller transmits such a command as shown in FIG. 20A to the target. Since the command uses the AV/C command set, CTS="0000". Since the command for controlling the equipment from the outside (CONTROL) is used for ctype (command type), ctype="0000" (see FIG. 19). Since the subunit type is the tape recorder/player, subunit type= "00100" (see FIG. 19). id shows a case of ID0 and so id=000. Opcode becomes "C3h" which means PLAYBACK (see FIG. 19). Operand becomes "75h" which means FORWARD. When playing back, the target returns such a response as shown in FIG. 20B to the controller. In this example, because the response contains "accepted", response="1001". Since others are the same as those in FIG. 20A except this response, the description will be omitted.

Next, processings which are executed in the structure of this example will be described with reference to FIG. 21 and after. First of all, a process example of a case where video data outputted to the bus 1 from the first video equipment 30 shown in FIG. 1 is supplied to the first video receiver 10 for receiving an image will be described. In this case, it is arranged that the first video equipment 30 that is a signal source assigns a number termed "preset entry" to each inputting equipment and can manage them using the preset entry number.

FIG. 21 is a diagram showing an example of a case where the first video receiver 10 inquires the first video-equipment 30 about the preset entry. The first video receiver 10 transmits first an output preset control command along the form of AV/C command to the first video equipment 30 (step S11), and acquires data of the preset entry number through a response to that command from the first video equipment 30 (step S12). It is arranged that a control section in the first video equipment 30 manages the preset entry number and therefore processing based on instructions from an equipment which inputs data outputted from the first video equipment 30 can be performed.

The preset entry number set by the first video equipment 30 is the number which is preset for each equipment so that the first video equipment 30 can output. The maximum number of equipments which can simultaneously input data from one equipment 30 corresponds to the maximum value of preset entry number. For example, three preset entries of video data can be set for the first video equipment 30. As shown in FIG. 22, three preset entry 1, 2, 3 are set and node IDs of equipments on the output side are stored for the respective preset entry numbers. In this example, a node ID of the first video receiver 10 is stored for the preset entry number 1 and a node ID of the second video receiver 20 is stored for the preset entry number 2.

FIG. 23 is a diagram showing the structure of the output preset control command (the left side of FIG. 23) and the structure of the response to that command (the right side oof FIG. 23). Additionally, portions shown by "<<<" in the response indicates portions in which data arranged in the command is returned as it is (The same applies to other drawings described below.).

The output preset control command will be described first. A value of the control command of "output preset" showing that it is the relevant command is transmitted as eight-bit data of opcode. Then, data of the preset entry number is arranged in an eight-bit interval of "operand (0)" and "zero" is arranged in one bit at the head of an eight-bit interval of "operand (0)". A value of "0x7F" which is the maximum value in the hexadecimal number represented by seven bits is arranged in the remaining interval. Additionally, a data value to which 0x is attached represents that it is a hexadecimal value such as 0, 1 2, . . . 9, A, B, . . . E, F). This is the same value as the hexadecimal value shown by attaching h at its end.

In "operand (1)" and "operand (2)" is arranged a destination ID which is a node ID of a destination equipment (an equipment forming the input side). In "operand (3)" and "operand (4)" are arranged data on a subunit of the destination equipment (the equipment forming the input side) and data on a subunit plug of the destination equipment as signal destination data.

Regarding the response to this command, the same data as the command is returned in intervals other than "operand (0)", and data on a preset entry number which is preset for the relevant destination equipment is arranged in "operand (0)" interval.

In addition, when this command has been transmitted, a control section within the source equipment stores not only the correspondence between the preset entry number and node ID shown in FIG. 22 but also other data indicated by the command. Further, it stores a setting status of the input plug, etc. in the destination equipment receiving data from the source equipment. Then, if the source equipment transmits various control commands after indicating the preset entry number, etc., the destination equipment will be able to instruct directly the source equipment about various operations.

Moreover, when the first video receiver 10 (source equipment) inquires from the first video equipment 30 (destination equipment) how many entries can be preset, it transmits an output preset status command. FIG. 24 shows the structure of the output preset status command. FIG. 24 shows the structure of the output preset status command (the left side of FIG. 24) and the structure of the response to the command (the right side of FIG. 24). The structure of the command will be described below. A value of status command of "output preset" showing that it is the relevant command, is transmitted as data of "opcode". Data on preset entry number is arranged as a value of "operand (0). In "operand (1)" to "operand (4)" are arranged the maximum value of hexadecimal number "0xFF" respectively so as to indicate that it is a field desirable for acquiring a response to the inquiry.

Regarding the response to this command from the destination equipment, a node ID of the destination equipment is arranged in "operand (1)" and "operand (2)" interval. In "operand (3)" and "operand (4)" are arranged data on a subunit of the destination equipment and data on a subunit plug of the destination equipment as a signal destination data. In the other intervals, the command data is returned as it is.

Additionally, in this output preset status command, when a predetermined data such as the maximum value is arranged in "operand (0)" interval for preset entry data of the command, it is designed that the maximum value data of the preset entry number which can be set is transmitted in the corresponding interval of the response in order to indicate how many units can be connected.

Moreover, when the source equipment decides that the input must be switched after measuring data preset in this way, the source equipment can also control an input selection in the destination equipment by transmitting command therefrom. FIG. 25 is a diagram showing the structure of an input select control command (the left side of FIG. 25) and the structure of its response (the right side of FIG. 25) in this case.

The input select control command will be described first. A value of control command "input select" showing that it is the relevant is transmitted using "opcode" data. Data of subfunction is arranged in "operand (0)". This subfunction data has at least two status. One of them corresponds to a case where the input change instructions by the command transmitted at that time is instructions to make the input change perform at once. The other of them corresponds to another case where the input change instructions by command transmitted at that time is instructions to communicate it to the destination equipment that input change is instructed and make the destination equipment wait on stand by without performing the input change.

The first half four bit portion of "operand (1)" interval is made to be reserved and the second half four bit portion includes the maximum value of hexadecimal number "0xF. In "operand (2)" and "operand (3)" is arranged node ID data on the output side. In "operand (4)" is arranged output plug data of unit. In "operand (5)" is arranged input plug data. In "operand (6)" and "operand (7)" are arranged data on a subunit of the destination equipment and data on a subunit plug of the destination equipment as signal destination data. "Operand (8)" interval is made to be reserved. Additionally, when the maximum value "0xFF" is set for "operand (5)", the target (i.e. an equipment on the receiving side) determines the input plug number and the determined input plug number is returned as response.

Regarding the response to this command, the same data as the command is returned in intervals other than "operand (1). In the second half four bit portion of the "operand (1)" is arranged "result status" which is data on the status of the destination equipment. For example, when the destination equipment is made to be the first video equipment 30, if the first video equipment 30 is under recording operation of video data and the like, data is arranged which shows that.

Furthermore, an input select status command is also prepared, e.g. for inquiring the setting status of input selection on the destination equipment side. FIG. 26 is a diagram showing the structure of the input select status command (the left side of FIG. 26) and its response (the right side of FIG. 26).

The input select status command will be described first. A value of status command of "input select" which shows that it is the relevant command is transmitted as "opcode" data. In "operand (0)" to "operand (4)" and "operand (6)" is respectively arranged the maximum value "0xFF" which shows that it is a field desirable for acquiring a response to the inquiry. In "operand (7)" is arranged a fixed value "0xFE". "Operand (8)" is reserved.

As to its response, in the first half four bit portion of "operand (1)" interval is arranged status data indicating the input status of the relevant equipment. In the second half four bit portion is arranged a fixed value "0xF". The status data indicates whether valid data is being inputted or not. In each of "operand (2)" and "operand (3)" intervals is arranged node ID data on the output side. In "operand (4)" interval is arranged data on output plug of unit. In each of "operand (6)" and "operand (7)" are arranged data on a subunit of a source equipment and data on a subunit plug of the source equipment as signal destination data. By using such a status command and its response the source equipment can also inquire the input status.

Figure 27:
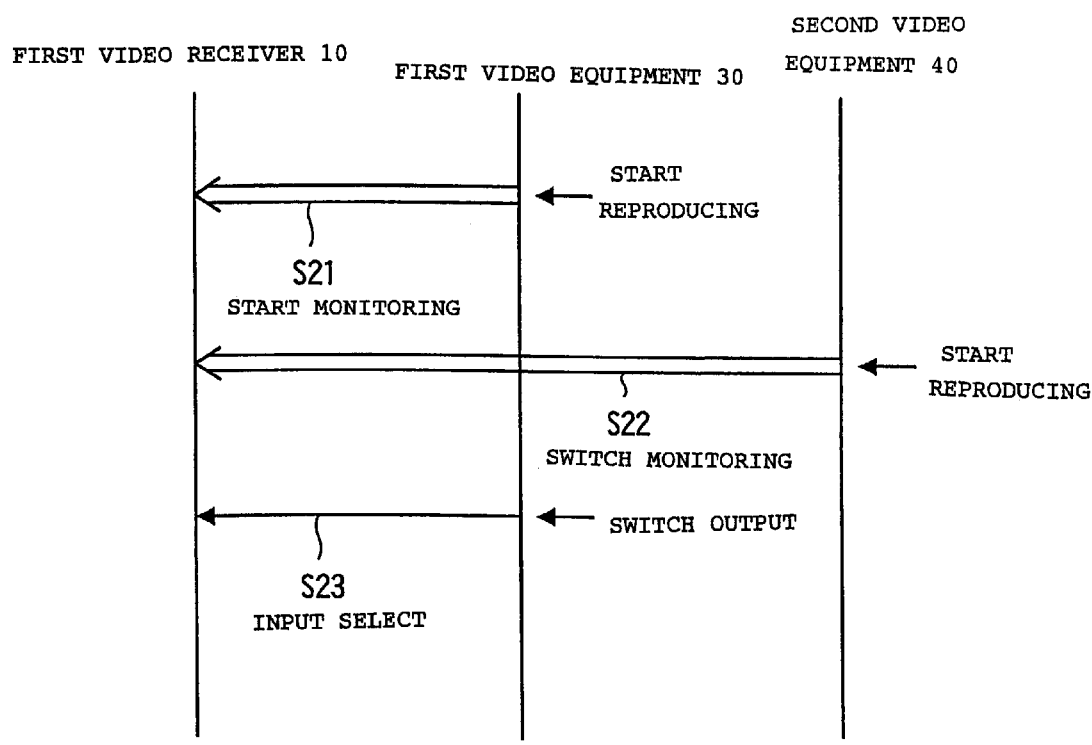
FIG. 27 is an explanatory diagram showing a use example of the subfunction according to the first mode for carrying out the present invention.

In this connection, a use example of the subfunction prepared in the input select control command will be described with reference to FIG. 27. In this example, it is arranged that the first video receiver 10 executes selectively a video data input outputted from the first video equipment 30 and another video data input outputted from the second video equipment 40. Specifically, it is assumed that a playback operation of a recording medium is performed at some moment in the first video equipment 30, and the first video receiver 10 selects an input plug through which its reproduced data is supplied via the bus 1 to cause monitoring the reproduced video data to be started (step S21). Thereafter, a playback operation of a recording medium is performed also in the second video equipment 40 while the first video equipment 30 continues to reproduce and the first video receiver 10 is switched so as to select an input plug through which its reproduced data is supplied, so that the monitoring is switched to that of video data from the second video equipment 40 (step S22).

Under these conditions, it is assumed that the video data recorded in the medium which is reproduced by the first video equipment 30 is switched from digital video data to analog video signal. On this occasion, if the first video equipment 30 has no function to convert the analog video signal to the digital video data, the first video equipment 30 must instruct the first video receiver 10 about switching the input plug to the analog input port 14. The instructions are transmitted from the first video equipment 30 to the first video receiver 10 as a remote input select control command (step S23).

This command only requests of the first video receiver 10 to wait on standby without making the corresponding switching (request level). By doing so, at the stage where the command of step S23 is transmitted, the input of the first video receiver 10 is not switched and the monitoring of image from the second video equipment 40 is not disturbed. Then, at the stage where the first video receiver 10 switches its input to the first video equipment 30 by some later operation, the analog input port 14 is selected instead of the input plug via the bus 1 and the monitoring of video signal from the first video equipment 30 can properly be performed based on data which is switched to the input from the first video equipment 30 by the command of step S23. When the input is switched from analog signal to digital data, the same processing can also be applied. Moreover, the same processing cam also be applied to a case where a change occurs in the route via the bus 1.

Figure 28:
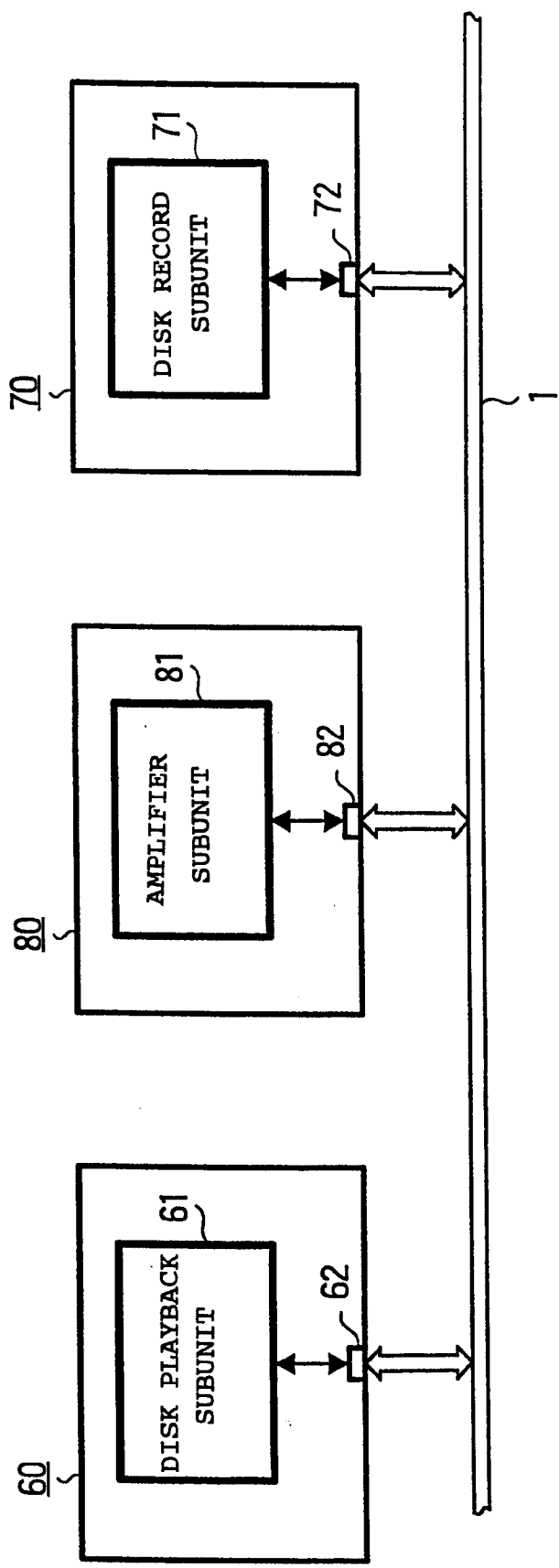
FIG. 28 is an explanatory diagram showing an example of the system configuration according to the second mode for carrying out the present invention.

Next, a second embodiment of the present invention will be described with reference to FIG. 28 to FIG. 34. In this example also, a plurality of equipments are connected through a serial data bus line (hereinafter merely referred to as bus) according to IEEE1394 standard, which is a digital communication control bus. In FIG. 28, an example in which three AV equipments 60, 70, 80 are connected through the bus 1 is shown. The equipments connected to the bus 1 comprises herein the respective terminals for connecting them to the IEEE1394 type bus, thus making the first and second disk equipments 60, 70 connect to an amplifier device 80.

The first and second disk equipments 60, 70 include a disk playback subunit 61 and a disk record subunit 71, respectively. The former reproduces data from a disk in which audio data and the like are recorded and the latter records inputted audio data and the like in a disk. The amplifier device 80 includes an amplifier subunit 81 which performs amplification of the inputted audio data or the like and then supplies the resulting data to a speaker (not shown) for outputting.

The equipments 60, 70, 80 have plugs 62, 72, 82 for connecting them to the IEEE1394 type bus 1, respectively. Although detailed structures of the respective equipments 60, 70, 80 are not described, the communication control processing through the bus 1 can be implemented by comprising an interface for communicating with the IEEE1394 type bus 1, a CPU for controlling the interface, memories for storing control program, etc. and the like in the same way as in case of the equipments 10, 30 described with reference to FIG. 2 and FIG. 3 showing the first embodiment. The plugs 62, 72, 82 included in the respective equipments 60, 70, 80 are also formed by a plurality of imaginary input plugs and a plurality of imaginary output plugs for communicating with a plurality of equipments connected to the bus 1. As to the frame cycle in which communication takes place through the IEEE1394 type bus 1 and transmission processings of the AV/C command applied to transmission through the bus 1, the same processings as described with the first embodiment apply thereto.

The control between the source equipment and the destination equipment is performed by transmitting various commands described above with the first embodiment. In this embodiment, a signal source status command is further prepared, thereby allowing the other source equipment to be specified when the source equipment is unable to output.

FIG. 29 is a diagram showing the structure of the signal source status command (the left side of FIG. 29) and the structure of its response (the right side of FIG. 29). Describing the command structure first, a status command value of "signal source" indicating that it is the relevant command is transmitted as "opcode" data. In "operand (0)" to "operand (2)" are arranged fixed values of "0xFF" indicating that it is a field for acquiring a response to inquiry. In "operand (3)" and "operand (4)" are arranged data on signal destination. This signal destination data indicates an output plug of unit or a destination plug of subunit.

Regarding its response, data on the status of equipment is arranged using three bits at the head of "operand (0)". As one of the status, a virtual output is herein prepared. Data "conv" on whether data is converted or not in the equipment is arranged using the next one bit in "operand (0)". Data on the signal status is arranged using the remaining four bits. In "operand (1)" and "operand (2)" are arranged data on a subunit of the source equipment and data on a source plug of the subunit.

In addition, when the virtual output is indicated in operand (0)" of the response to the signal source status command, "operand (1)" and "operand (2)" have such structures as shown in FIG. 30. Specifically, a fixed value "0x3" is arranged using the first two bits of "operand (1)" and data on isochronous channel used for the virtual output is arranged using the last six bits. In "operand (2)" is arranged data on ID of the input plug through which the source equipment inputs the isochronous channel data.

One of use examples of the status command of the signal source will be described with reference to FIG. 31 and FIG. 32. To begin with, a description will be given based on a flow chart of FIG. 31. For example, it is assumed that audio data reproduced by the first disk equipment 60 is transmitted to the second disk equipment 70 through the bus 1 and a dubbing operation is started that the second disk equipment records the data onto the disk (step ST11). After this dubbing has started, it is assumed that the amplifier device 80 requires the second disk equipment 70 to supply the audio data outputted therefrom (step ST12). This request may be performed by the signal source command for example.

When this request is transmitted, the virtual output is indicated in the response to this command and also the isochronous channel through which the source equipment inputs and the input plug number of the source equipments are indicated using "operand (1)" and "operand (2)" (step ST13). In this example, since the second disk equipment 70 records the audio data from the first disk equipment 60, the isochronous channel through which the first disk equipment 60 outputs the data is specified.

When the isochronous channel specified by this response is a broadcast channel (broadcast communication channel), any equipment connected to the bus 1 can input. Accordingly, the amplifier device 80 receives through this broadcast channel the output from the first disk equipment 60 (step ST14). When it is desired to receive such an output from the second disk equipment 70, a mode of receiving data which the equipment 70 inputs (herein an output of the first disk equipment 60) instead of the output of the equipment 70 is herein termed "virtual output".

Figure 32:
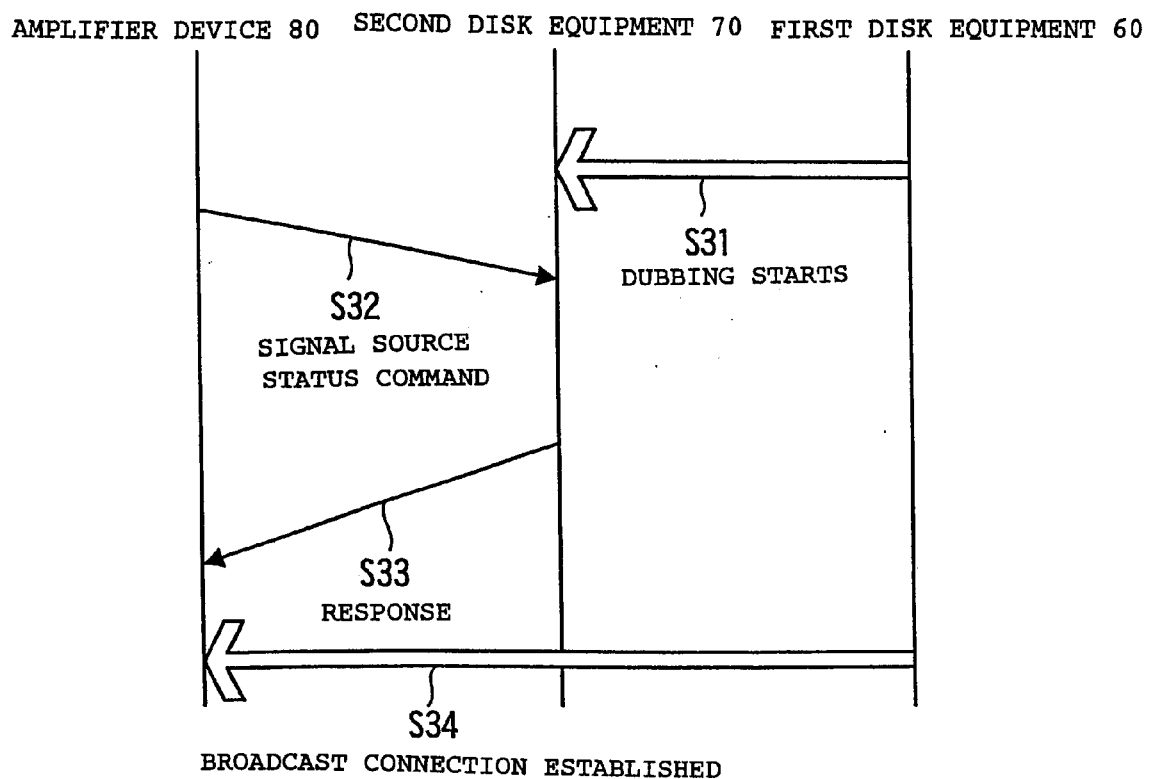
FIG. 32 is an explanatory diagram showing the process example (example 1) of the rec. monitor according to the second mode for carrying out the present invention.

The process shown in this flow chart can be illustrated in time sequence as shown in FIG. 32. Specifically, it is assumed that the status command of signal source requiring to output is transmitted from the amplifier device 80 to the second disk equipment 70 (step S32) after the dubbing from the first disk equipment 60 to the second disk equipment 70 is started at step S31. In its response on this occasion, the virtual output is indicated and the broadcast channel is specified as the channel at that time (step S33).

When the broadcast channel is specified, the amplifier device 80 processes to receive the specified broadcast channel and processes to output the audio data supplied from the first disk equipment 60 (this audio data is the same as what is being recorded in the second disk equipment 70) (step S34).

Figure 33:
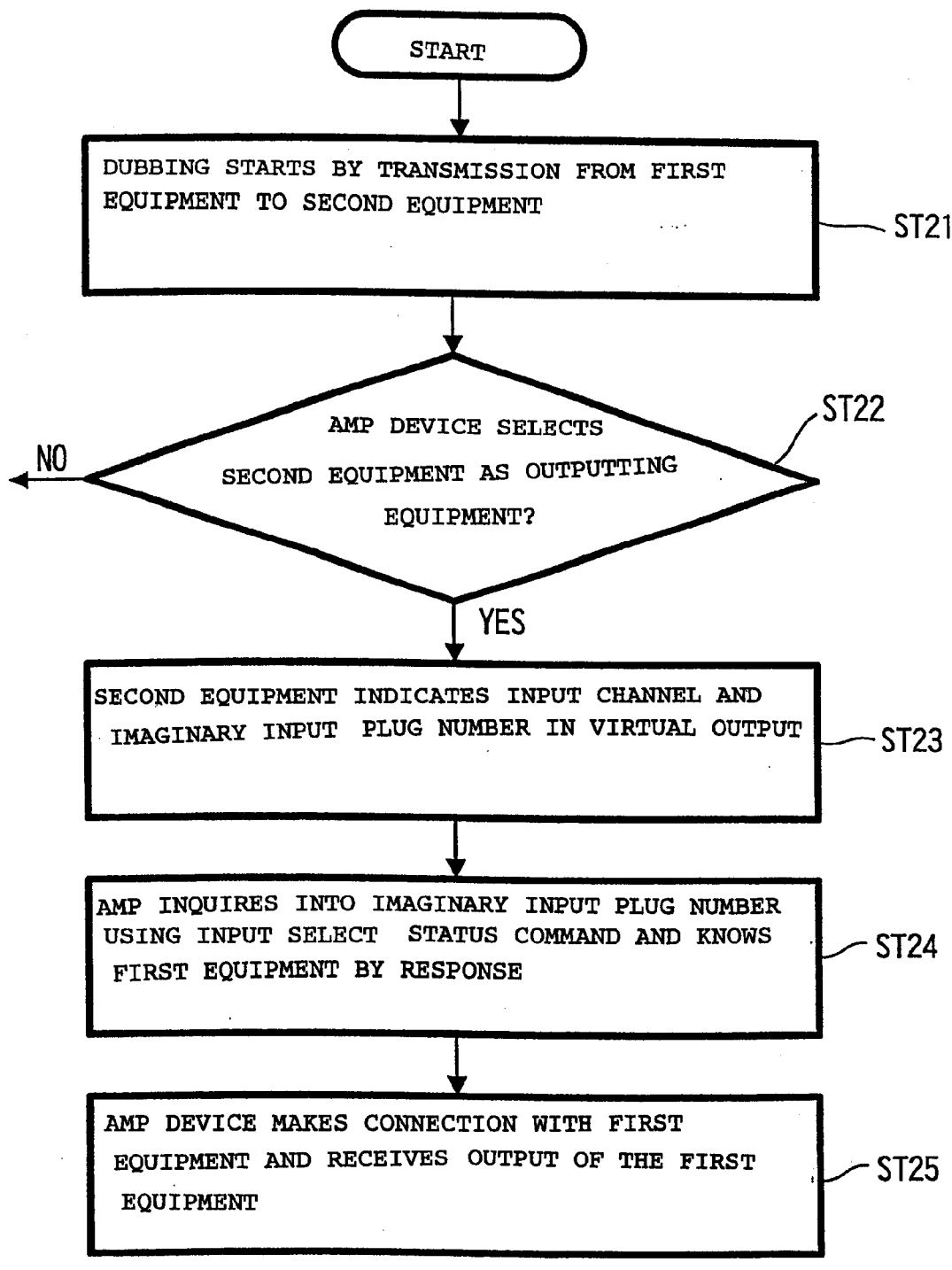
FIG. 33 is a flow chart showing a process example (example 2) of the rec. monitor according to the second mode for carrying out the present invention.

Next, the process in a case where the isochronous channel specified by the response is not the broadcast channel will be described with reference to FIG. 33 and FIG. 34.

A description will be given first based on a flow chart of to FIG. 33. For example, it is assumed that audio data reproduced by the first disk equipment 60 is transmitted through the bus 1 to the second disk equipment 70, which starts a dubbing operation to record the data on to the disk (step ST21). After this dubbing has started, it is assumed that the amplifier device 80 requires the second disk equipment 70 to supply the audio data outputted therefrom to the amplifier device 80 (step ST22). This request may be performed by the signal source command for example. In its response on this occasion, the input channel and the imaginary input plug number are transmitted (step ST23). It is here assumed that a channel number other than the broadcast channel is specified as the channel number indicated by this response.

If the channel number other than the broadcast channel is specified, the amplifier device 80 inquires about an equipment which outputs data inputted to the imaginary input plug number using the input select status command, and decides the outputting equipment (This is herein the first disk equipment 60) by its response (step ST24).

Then, a point-to point connection is established, which makes a transmission line between the imaginary output plug of the decided equipment on the output side (the first disk equipment 60) and the imaginary input plug of the amplifier device 80 using a specific isochronous channel, thereby causing the amplifier device 80 to receive the output of the first disk equipment 60 (step ST25).

Figure 34:
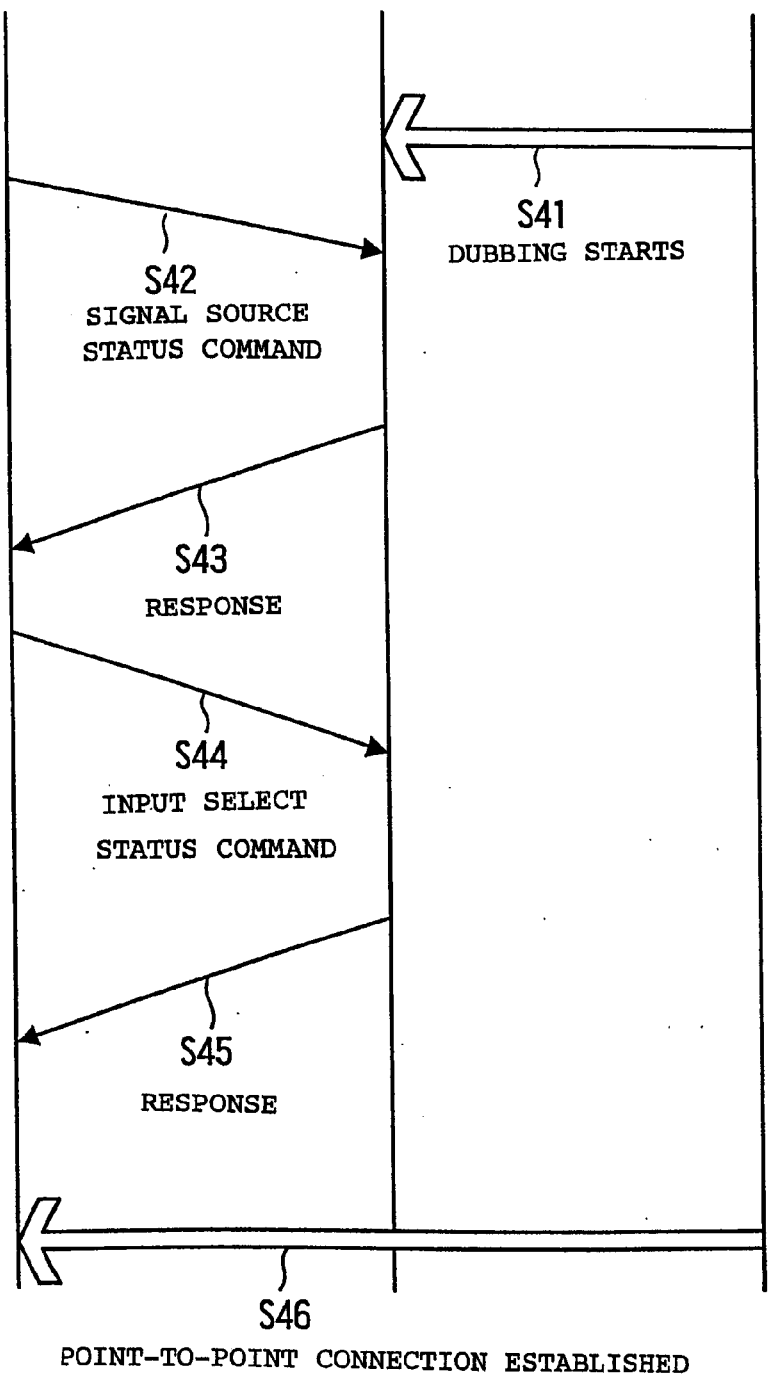
FIG. 34 is an explanatory diagram showing the process example (example 2) of the rec. monitor according to the second mode for carrying out the present invention.

FIG. 34 illustrates the process shown in this flow chart in time sequence. Specifically, it is assumed that the status command of signal source requiring to output is transmitted from the amplifier device 80 to the second disk equipment 70 (step S42) after the dubbing from the first disk equipment 60 to the second disk equipment 70 is started at step S41. In its response on this occasion, the virtual output is indicated (step S43). In this example, because the isochronous channel indicated by this response is a channel other than the broadcast channel, the input select status command is used to inquire about an equipment which outputs data inputted to the imaginary input plug number (step S44) and the outputting equipment (This is herein the first disk equipment 60.) is decided by its response (step S45).

After the processing so far has been completed, the amplifier device 80 processes to make a point-to point connection with the first disk equipment 60 established. When the connection is established, the amplifier device 80 starts inputting audio data outputted from the first disk equipment 60 (step S46).

By being processed in this manner, when it is impossible to make data output from the equipment which is indicated to output the data (or when it is inappropriate to make output from that equipment), if there is any equipment which can be made to output instead, then it is possible to cause transmission from that equipment to be performed. Thus, satisfactory processings for data transmission can be carried out. In this case, whether the broadcast channel is used as shown in FIG. 31 and FIG. 32 or the broadcast channel is not used as shown in FIG. 33 and FIG. 34, both cases can be coped with.

In addition, although each embodiment described above is the example in which data transmission takes place along the AV/C command format within the network formed by the IEEE1394 type bus, the present invention can be applied to cases where processings are made in a network or format having the other structure. In this case, the present invention is also applicable to a network which includes a bus line where similar data transmission is performed by radio instead of the bus line which is connected by wire.

Also, having described above the embodiments in which means for performing the above processing are previously installed within a communication device connected to a network, it may be arranged that, for example, a program for executing each processing described above is retained in some medium and program data obtained from that medium are stored in memories, thereby enabling the communication device capable of the corresponding processing to be achieved. As to the medium which retains the program data in this case, a medium of the server for the Internet and the like may be employed in addition to storage media such as a magnetic tape, an optical disk an the like.

What is claimed is:

1. An equipment control method of performing the control between equipments connected through a predetermined bus line, wherein when data outputted from a first equipment can be inputted by a second equipment, data on an output route change of that data from the first equipment is transmitted to the second equipment through the bus line; and wherein for the data on the output route change, at least two kinds of requests are prepared, a first request instructing the second equipment about input switching to the changed route and a second request not instructing about the input switching, but causing the second equipment to estimate only the route change.

2. An equipment control method according to claim 1, wherein the output route includes an output route other than the bus line.

3. A transmission apparatus capable of data transmission with other equipment connected through a predetermined bus line, comprising a command producing section for producing a command of a predetermined format instructing other equipment connected through the bus line about an output route change, and a sending section for sending out the command produced by the command producing section to the bus line;

wherein for the command on the output route change produced by the command producing section, a command instructing about input switching to the changed route and a command not instruction about the input switching, but deciding only the route change are prepared.

4. An transmission apparatus according to claim 3, wherein the output route indicated by the command produced by the command producing section includes an output route other than the bus line.

5. A medium in which a program for performing the control between equipments connected through a predetermined bus line, wherein when data outputted from a first equipment can be inputted by a second equipment, the program comprises the step of causing data on a change of an output route of the data from the first equipment to be transmitted to the second equipment through the bus line; and wherein the processing on a change of the output route in the above step includes at least two kinds of requests, a request instructing the second equipment at least about input switching to the changed route, and another request not instructing the second equipment about input switching, but only causing the second equipment to estimate the change of route.

6. A medium according to claim 5, wherein the output route to be changed in the above step includes an output route other than the bus line.

* * * * *